US012488753B2

(12) United States Patent
Lai et al.

(10) Patent No.: US 12,488,753 B2
(45) Date of Patent: Dec. 2, 2025

(54) DISPLAY PANEL AND DISPLAY DEVICE

(71) Applicant: Xiamen Tianma Display Technology Co., Ltd., Xiamen (CN)

(72) Inventors: Qingjun Lai, Xiamen (CN); Jinjin Yang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/759,707

(22) Filed: Jun. 28, 2024

(65) Prior Publication Data

US 2024/0355289 A1 Oct. 24, 2024

(30) Foreign Application Priority Data

Jun. 30, 2023 (CN) ......................... 202310799443.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01)

(58) Field of Classification Search
None
See application file for complete search history.

(56) References Cited

U.S. PATENT DOCUMENTS

2022/0335872 A1* 10/2022 Zhang .................. G09G 3/3233

* cited by examiner

*Primary Examiner* — Christopher J Kohlman
(74) *Attorney, Agent, or Firm* — KDW FIRM PLLC

(57) ABSTRACT

A display panel and a display device are provided. A compensation module of a pixel circuit of a display panel is on in a bias adjustment stage, a data write stage, and a time period between the bias adjustment stage and the data write stage; and/or, a reset module of the pixel circuit is on in the bias adjustment stage and a reset stage and is turned off at least after the compensation module is turned on.

20 Claims, 7 Drawing Sheets

DISPLAY PANEL AND DISPLAY DEVICE

CROSS-REFERENCE TO RELATED APPLICATION(S)

This application claims priority to Chinese Patent Application No. 202310799443.0 filed on Jun. 30, 2023, the disclosure of which is incorporated herein by reference in its entirety.

TECHNICAL FIELD

The present disclosure relates to the field of display technology and, in particular, to a display panel and a display device.

BACKGROUND

A self-luminous display panel is usually provided with a light-emitting element. Therefore, it is unnecessary to provide a backlight module used for supplying a light source for the display panel so that the self-luminous display panel is thin and has a simple structure, which has become a research focus in the current display field.

As a key component in the display panel, a pixel circuit plays an important role in supplying a drive current to the light-emitting element of the display panel. The driving process of an existing pixel circuit is relatively complex, requiring a driver circuit for driving the pixel circuit to have a higher processing capacity. Accordingly, the process complexity and process preparation cost of the driver circuit in the display panel are relatively high.

SUMMARY

The present disclosure provides a display panel and a display device.

In one aspect of the present disclosure, a display panel is provided. The display panel includes a pixel circuit and a light-emitting element.

The pixel circuit includes a drive module, a compensation module, a reset module, a data write module, and a bias adjustment module.

The drive module includes a drive transistor. The drive transistor includes a gate, a first electrode, and a second electrode. The compensation module is connected between the gate of the drive transistor and the second electrode of the drive transistor.

A working process of the display panel includes a reset stage, a data write stage, and a bias adjustment stage.

The reset module is configured to supply a reset signal to the drive transistor in the reset stage.

The data write module is configured to supply a data signal to the drive transistor in the data write stage.

The bias adjustment module is turned on and is configured to supply a bias adjustment signal to the drive transistor in the bias adjustment stage.

The display panel satisfies at least one of the following: the compensation module is on in the bias adjustment stage, the data write stage, and a time period between the bias adjustment stage and the data write stage; or, the reset module is on in the bias adjustment stage and the reset stage and the reset module is turned off at least after the compensation module is turned on.

According to another aspect of the present disclosure, a display device is provided. The display device includes the display panel described in the first aspect.

For the display panel and the display device according to embodiments of the present disclosure, the compensation module is on in the bias adjustment stage, the data write stage, and the time period between the bias adjustment stage and the data write stage; moreover/alternatively, the reset module is on in the bias adjustment stage and the reset stage and is turned off at least after the compensation module is turned on.

It is to be understood that the content described in this section is neither intended to identify key or critical features of embodiments of the present disclosure nor intended to limit the scope of the present disclosure. Other features of the present disclosure become easily understood through the description hereinafter.

BRIEF DESCRIPTION OF DRAWINGS

To illustrate technical solutions in embodiments of the present disclosure more clearly, drawings used in the description of the embodiments are briefly described below. Apparently, the drawings described below only illustrate part of embodiments of the present disclosure, and those of ordinary skill in the art may obtain other drawings based on the drawings on the premise that no creative work is done.

DETAILED DESCRIPTION

Technical solutions in embodiments of the present disclosure are described clearly and completely in conjunction with drawings in embodiments of the present disclosure from which technical solutions of the present disclosure are better understood by those skilled in the art. Apparently, the embodiments described below are part, not all, of embodiments of the present disclosure. Based on embodiments of the present disclosure, all other embodiments obtained by those of ordinary skill in the art on the premise that no creative work is done are within the scope of the present disclosure.

It is to be noted that terms such as "first" and "second" in the description, claims and drawings of the present disclosure are used for distinguishing between similar objects and are not necessarily used for describing a particular order or sequence. It is to be understood that the data used in this manner are interchangeable in appropriate cases so that embodiments of the present disclosure described herein can be implemented in an order not illustrated or described herein. Additionally, the terms "including", "having" and variations thereof are intended to encompass a non-exclusive inclusion. For example, a process, method, system, product, or device that includes a series of steps or units not only includes the expressly listed steps or units but may also include other steps or units that are not expressly listed or are inherent to such process, method, product, or device.

Figure 1:
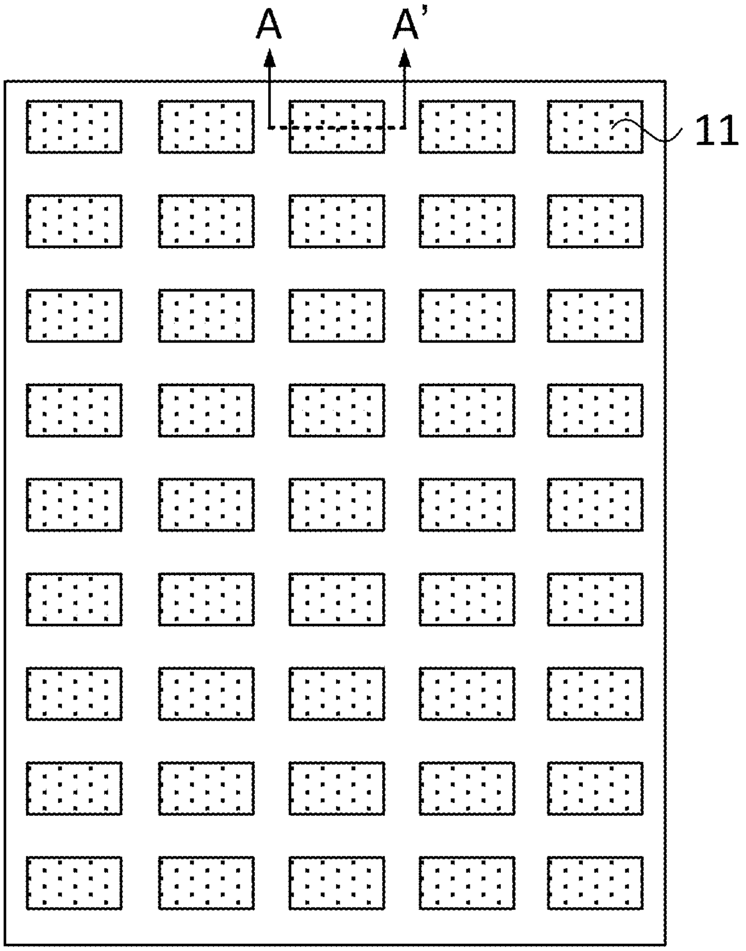
FIG. 1 is a structural diagram of a display panel according to an embodiment of the present disclosure.
Figure 2:
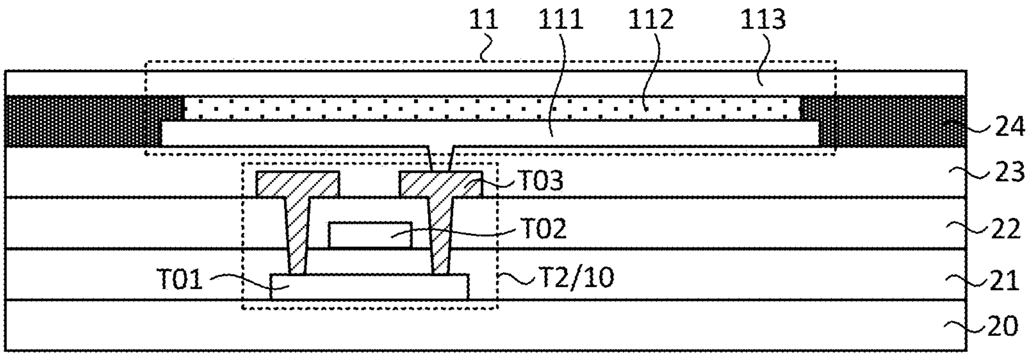
FIG. 2 is a sectional diagram taken along direction A-A' of FIG. 1.
Figure 3:
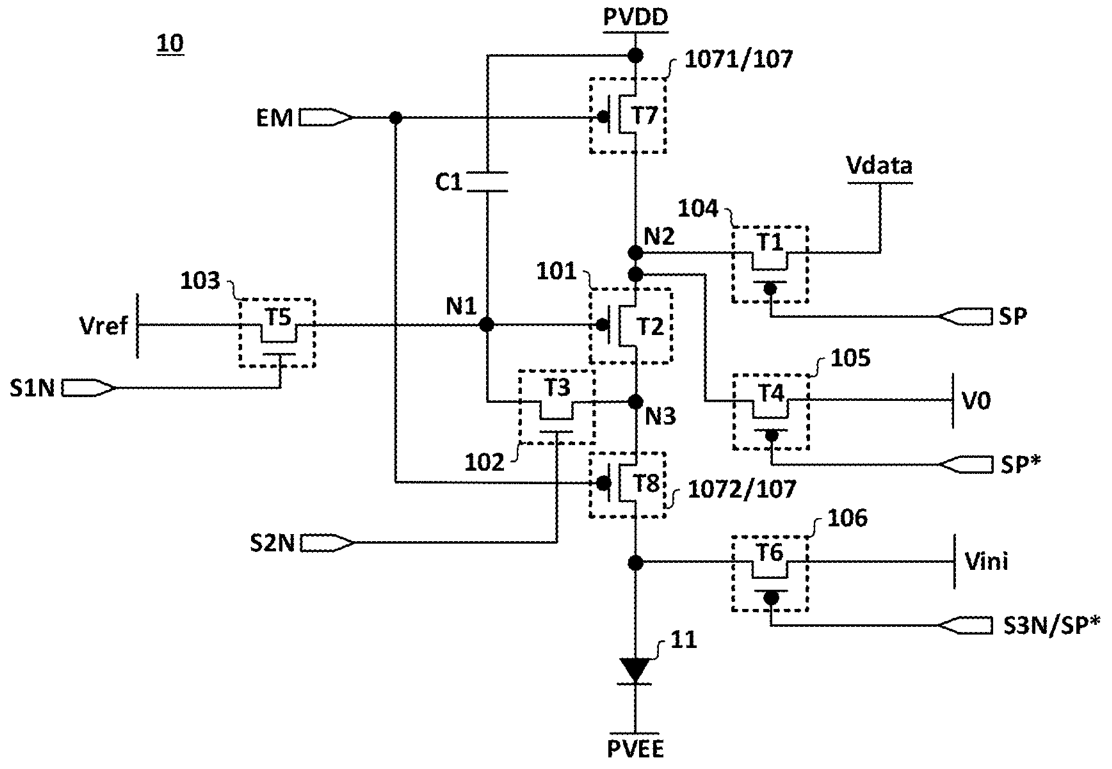
FIG. 3 is a structural diagram of a pixel circuit according to an embodiment of the present disclosure.
Figure 4:
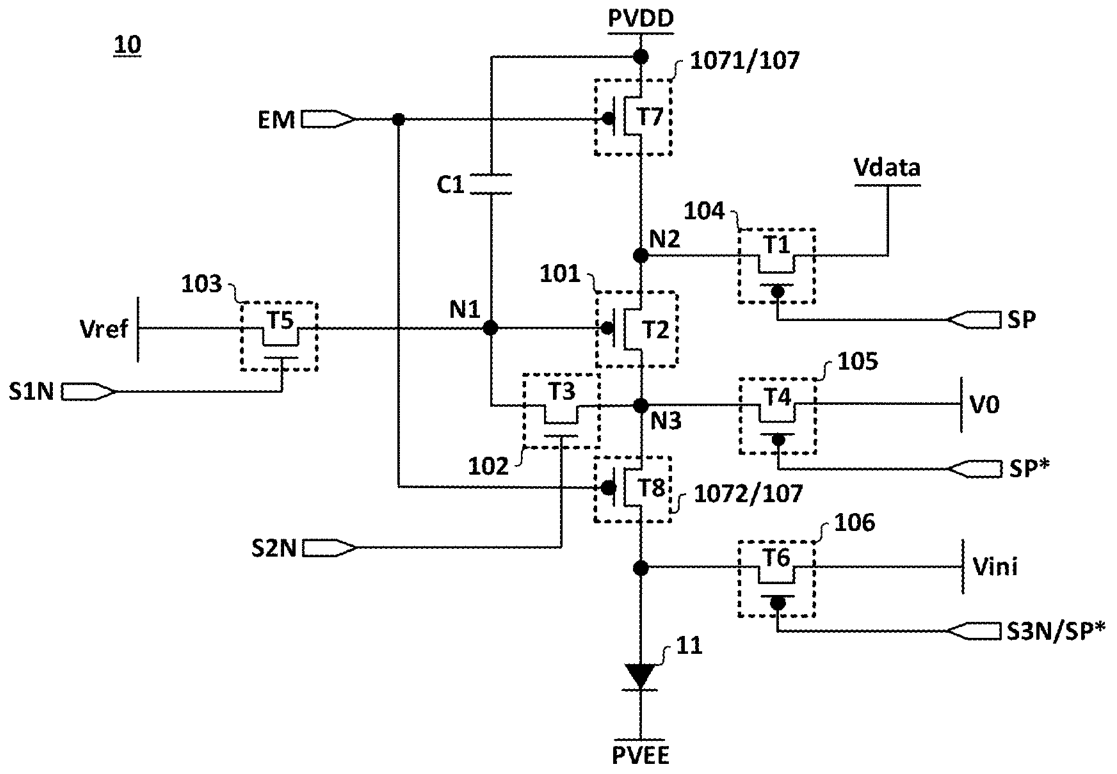
FIG. 4 is a structural diagram of another pixel circuit according to an embodiment of the present disclosure.
Figure 5:
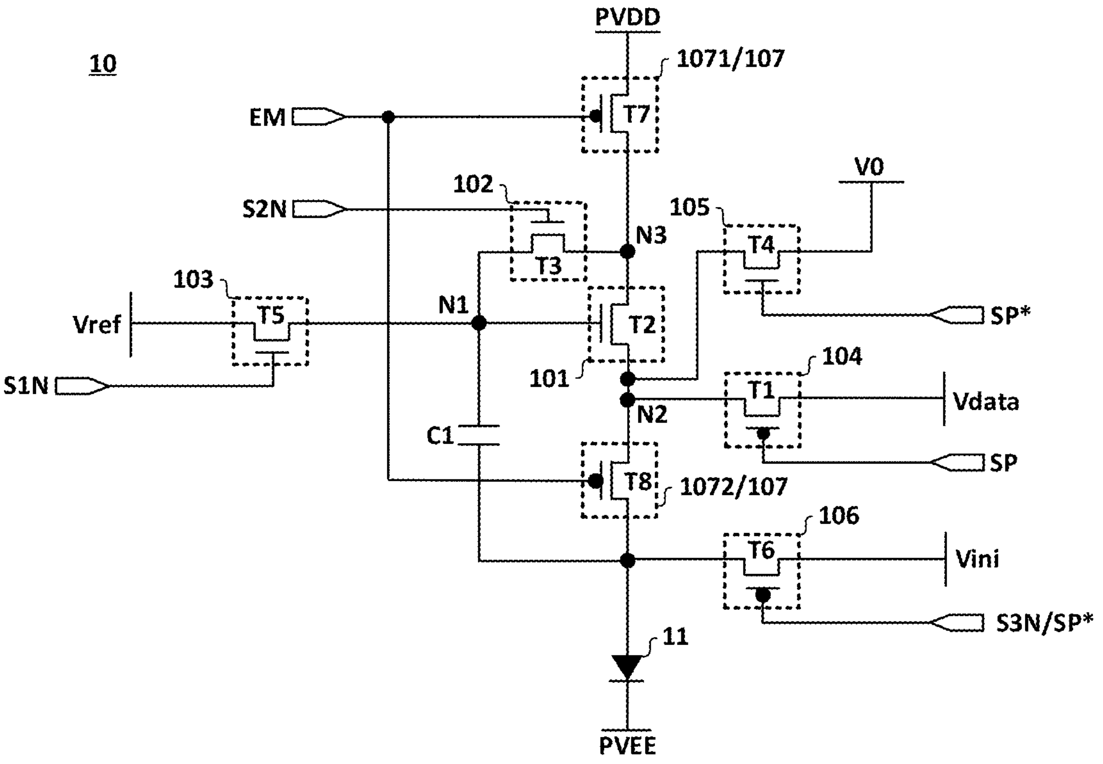
FIG. 5 is a structural diagram of another pixel circuit according to an embodiment of the present disclosure.
Figure 6:
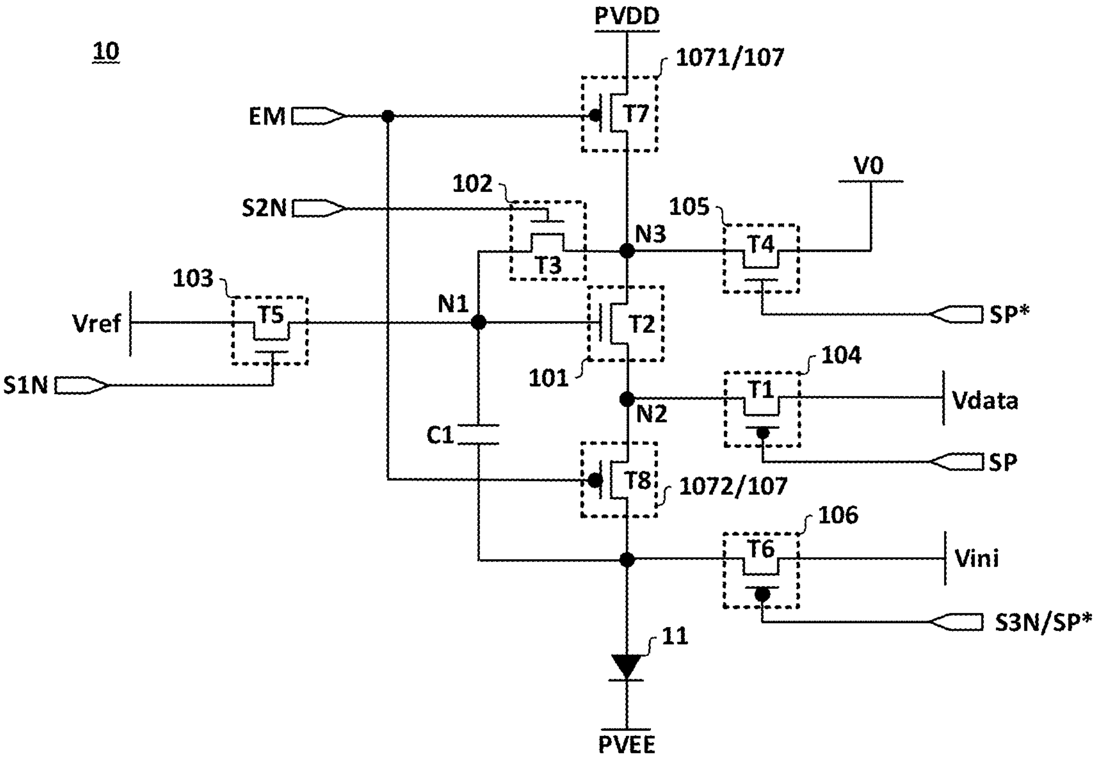
FIG. 6 is a structural diagram of another pixel circuit according to an embodiment of the present disclosure.
Figure 7:
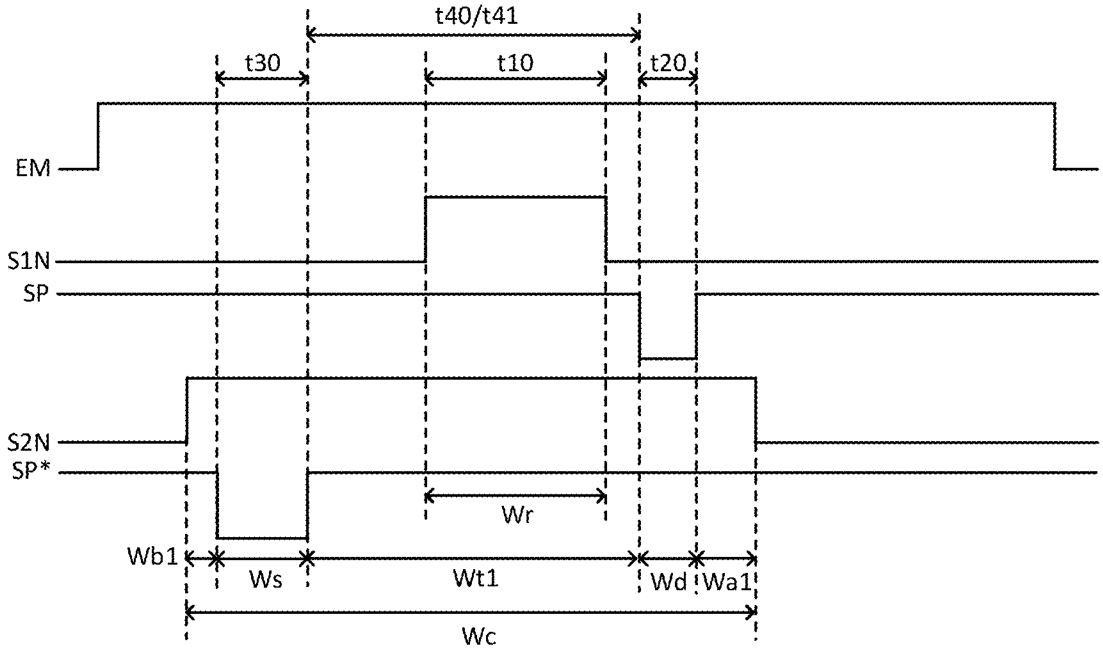
FIG. 7 is a drive timing diagram of a pixel circuit according to an embodiment of the present disclosure.
Figure 8:
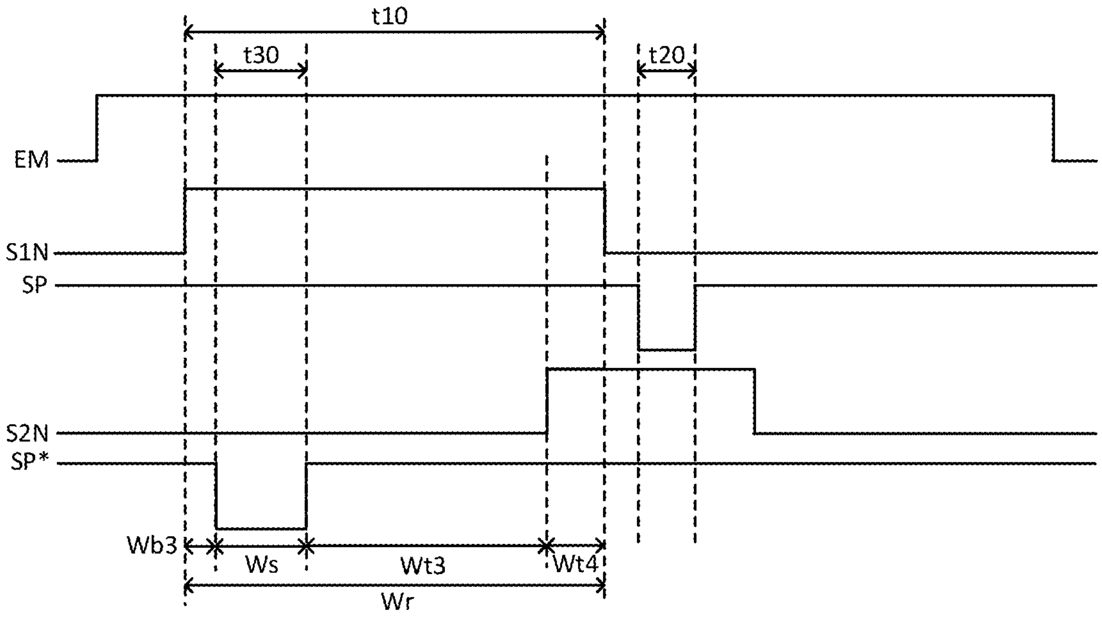
FIG. 8 is another drive timing diagram of a pixel circuit according to an embodiment of the present disclosure.

FIG. 1 is a structural diagram of a display panel according to an embodiment of the present disclosure. FIG. 2 is a sectional diagram taken along direction A-A' of FIG. 1. FIG. 3 is a structural diagram of a pixel circuit according to an embodiment of the present disclosure. FIG. 4 is a structural diagram of another pixel circuit according to an embodiment of the present disclosure. FIG. 5 is a structural diagram of another pixel circuit according to an embodiment of the present disclosure. FIG. 6 is a structural diagram of another pixel circuit according to an embodiment of the present disclosure. FIG. 7 is a drive timing diagram of a pixel circuit according to an embodiment of the present disclosure. FIG. 8 is another drive timing diagram of a pixel circuit according to an embodiment of the present disclosure. As shown in FIGS. 1 to 8, the display panel according to the embodiment of the present disclosure includes pixel circuits 10 and light-emitting elements 11. A pixel circuit 10 includes a drive module 101, a compensation module 102, a reset module 103, a data write module 104, and a bias adjustment module 105. The drive module 101 includes a drive transistor T2. The drive transistor T2 includes a gate, a first electrode, and a second electrode. The compensation module 102 is connected between the gate of the drive transistor T2 and the second electrode of the drive transistor T2.

A working process of the display panel includes a reset stage t10, a data write stage t20, and a bias adjustment stage t30. The reset module 103 supplies a reset signal Vref to the drive transistor T2 in the reset stage t10. The data write module 104 supplies a data signal Vdata to the drive transistor T2 in the data write stage t20. The bias adjustment module 105 is turned on and supplies a bias adjustment signal V0 to the drive transistor T2 in the bias adjustment stage t30.

The compensation module 102 is on in the bias adjustment stage t30, the data write stage t20, and a time period t40 between the bias adjustment stage t30 and the data write stage t20; and/or, the reset module 103 is on in the bias adjustment stage t30 and the reset stage t10 and is turned off at least after the compensation module 102 is turned on.

Specifically, as shown in FIGS. 1 and 2, the display panel may include multiple pixel circuits 10 arranged in array and multiple light-emitting elements 11 arranged in array. The arrangement manner of the pixel circuits 10 and the arrangement manner of the light-emitting elements 11 may be set according to actual requirements.

As shown in FIG. 2, when the light-emitting elements 11 are organic light-emitting diodes (OLEDs), each of the light-emitting elements 11 may include an anode 111, a light-emitting layer 112, and a cathode 113 that are stacked; however, it is not limited thereto. In other embodiments, the light-emitting elements 11 may also include micro light-emitting diodes (micro-LEDs or mini-LEDs) or other types of light-emitting components.

With continued reference to FIGS. 1 and 2, the multiple pixel circuits 10 are electrically connected to the multiple light-emitting elements 11 correspondingly. The pixel circuit 10 is configured to supply a drive current to a light-emitting element 11 electrically connected to the pixel circuit 10 to drive the light-emitting element 11 to emit light. Exemplarily, by way of example, the light-emitting element 11 is an organic light-emitting diode. When the pixel circuit 10 supplies the drive current to the light-emitting element 11, an electron is injected into a light-emitting layer 112 through a cathode 113, and a hole is injected into the light-emitting layer 112 through an anode 111. The electron and the hole are combined in the light-emitting layer 112 to release energy and emit light.

With continued reference to FIGS. 3 to 6, the pixel circuit 10 may specifically include the drive module 101, the compensation module 102, the reset module 103, the data write module 104, and the bias adjustment module 105.

The drive module 101 may be the drive transistor T2 configured to supply the drive current to the light-emitting element 11. Specifically, the drive transistor T2 includes the gate (that is, an N1 node), the first electrode (that is, an N2 node), and a second electrode (that is, an N3 node). The drive transistor T2 may be turned on according to the potential of the gate (N1 node) of the drive transistor T2. The drive current formed by the turning-on of the drive transistor T2 is used for driving the light-emitting element 11 to emit light. The potential of the gate of the drive transistor T2 may determine the magnitude of the turning-on current so that the brightness of the light-emitting element 11 can be adjusted by controlling the voltage of the gate of the drive transistor T2, implementing grayscale control.

The reset module 103 may be connected to the gate (N1 node) of the drive transistor T2 and configured to supply the reset signal Vref to the gate of the drive transistor T2. The data write module 104 may be connected to the first electrode (N2 node) of the drive transistor T2 and configured to supply the data signal Vdata to the drive transistor T2. The compensation module 102 may be connected to the gate (N1 node) of the drive transistor T2 and the second electrode (N3 node) of the drive transistor T2 and configured to compensate for the threshold voltage of the drive transistor T2. The bias adjustment module 105 may be connected to the first electrode (N2 node) of the drive transistor T2 or the second electrode (N3 node) of the drive transistor T2 and configured to supply the bias adjustment signal V0 to the drive transistor T2.

Additionally, with continued reference to FIGS. 3 to 6, the pixel circuit 10 may further include an initialization module 106 and a light emission control module 107. The initialization module 106 may be connected to the anode of the light-emitting element 11 and configured to supply an initialization signal Vini to the light-emitting element 11.

The light emission control module 107, the drive transistor T2, and the light-emitting element 11 are connected in series between a first power signal terminal and a second power signal terminal and are configured to selectively allow the light-emitting element 11 to enter a light emission stage. The first power signal terminal may be configured to supply a first power signal PVDD. The second power signal terminal may be configured to supply a second power signal PVEE. The voltage of the first power signal PVDD is greater than the voltage of the second power signal PVEE.

With continued reference to FIGS. 3 to 6, optionally, the light emission control module 107 includes a first light emission control module 1071 and a second light emission control module 1072. The first light emission control module 1071 is connected between the first power signal terminal and an electrode of the drive transistor T2. The first light emission control module 1071 may be configured to control the conduction or disconduction of a transmission path between the drive transistor T2 and the first power signal terminal. The second light emission control module 1072 is connected between another electrode of the drive transistor T2 and the light-emitting element 11. The second light emission control module 1072 may be configured to control the conduction or disconduction of a transmission path between the drive transistor T2 and the second power signal terminal.

With continued reference to FIGS. 3 to 6, in this embodiment, a control terminal of the data write module 104 receives a first scan signal SP. The first scan signal SP controls the data write module 104 to turn on and off. A control terminal of the compensation module 102 receives a second scan signal S2N. The second scan signal S2N controls the compensation module 102 to turn on and off. A control terminal of the bias adjustment module 105 receives a bias adjustment control signal SP*. The bias adjustment control signal SP* controls the bias adjustment module 105 to turn on and off. A control terminal of the reset module 103 receives a third scan signal S1N. The third scan signal S1N controls the reset module 103 to turn on and off. A control terminal of the initialization module 106 receives a fourth scan signal S3N. The fourth scan signal S3N controls the initialization module 106 to turn on and off. A control terminal of the light emission control module 107 receives a light emission control signal EM. The light emission control signal EM controls the light emission control module 107 to turn on and off.

Additionally, optionally, as shown in FIGS. 3 to 6, the data write module 104 includes a data write transistor T1. The first scan signal SP controls the data write transistor T1 to turn on and off. The compensation module 102 includes a compensation transistor T3. The second scan signal S2N controls the compensation transistor T3 to turn on and off. The bias adjustment module 105 includes a bias adjustment transistor T4. The bias adjustment control signal SP* controls the bias adjustment transistor T4 to turn on and off. The reset module 103 includes a reset transistor T5. The third scan signal S1N controls the reset transistor T5 to turn on and off. The initialization module 106 includes an initialization transistor T6. The fourth scan signal S3N controls the initialization transistor T6 to turn on and off. The first light emission control module 1071 includes a first light emission control transistor T7. The second light emission control module 1072 includes a second light emission control transistor T8. The light emission control signal EM controls the first light emission control transistor T7 and the second light emission control transistor T8 to turn on and off.

It is to be noted that when conditions permit, at least two of the first scan signal SP, the second scan signal S2N, the third scan signal S1N, the fourth scan signal S3N, the bias adjustment control signal SP*, the light emission control signal EM, and the like may be the same signal. For example, when the bias adjustment transistor T8 and the initialization transistor T6 are of the same type, the bias adjustment control signal SP* and the fourth scan signal S3N may be the same signal.

Additionally, as shown in FIGS. 3 and 4, when the drive transistor T2 is a PMOS-type transistor, the pixel circuit 10 may further include a storage capacitor C1. A first electrode of the storage capacitor C1 is connected to the first power signal terminal. A second electrode of the storage capacitor C1 is connected to the gate of the drive transistor T2 and configured to store signals transmitted to the gate of the drive transistor T2. As shown in FIG. 3, the bias adjustment module 105 is connected to the first electrode of the drive transistor T2, that is, the N2 node. As shown in FIG. 4, the bias adjustment module 105 is connected to the second electrode of the drive transistor T2, that is, the N3 node.

With continued reference to FIGS. 5 and 6, when the drive transistor T2 is an NMOS-type transistor, the pixel circuit 10 may also include the storage capacitor C1. The first electrode of the storage capacitor C1 is connected to the light-emitting element 11. The second electrode of the storage capacitor C1 is connected to the gate of the drive transistor T2 and configured to store the signals transmitted to the gate of the drive transistor T2. As shown in FIG. 5, the bias adjustment module 105 is connected to the first electrode of the drive transistor T2, that is, the N2 node. As shown in FIG. 6, the bias adjustment module 105 is connected to the second electrode of the drive transistor T2, that is, the N3 node.

With continued reference to FIGS. 7 and 8, the working process of the display panel at least includes the reset stage t10, the data write stage t20, and the bias adjustment stage t30.

As shown in FIGS. 3 to 8, by way of example, the reset module 103 is the NMOS-type reset transistor T5, the data write module 104 is the PMOS-type data write transistor T1, and the compensation module 102 is the NMOS-type compensation transistor T3.

In the reset stage t10, the third scan signal S1N is a high-level effective pulse so that the reset transistor T5 is turned on, the reset signal Vref is transmitted to the gate (N1 node) of the drive transistor T2 through the reset transistor T5 that is turned on, thereby resetting the gate of the drive transistor T2. In this case, the potential of the gate (N1 node) of the drive transistor T2 is consistent with the potential of the reset signal Vref to prevent a data signal of the previous frame carried on the gate of the drive transistor T2 from affecting the writing of a data signal of the next frame.

In the data write stage t20, the first scan signal SP is a low-level effective pulse, and the second scan signal S2N is a high-level effective pulse. In this case, the data write transistor T1 and the compensation transistor T3 are turned on. Moreover, the potential of the gate of the drive transistor T2 is consistent with the potential of the potential of the reset signal Vref. The drive transistor T2 is also turned on. The data signal Vdata passes through the data write transistor T1, the drive transistor T2, and the compensation transistor T3 and is applied to the gate (N1 node) of the drive transistor T2. The potential of the N1 node increases gradually until the drive transistor T2 is turned off. When the drive transistor T2 is turned off, the potential of the gate of the drive transistor T2 is $V_{data}-|V_{th}|$. $V_{data}$ denotes the voltage value of the data signal Vdata. $|V_{th}|$ denotes the threshold voltage of the drive transistor T2.

Further, after the data write stage t20 ends, the display panel may enter the light emission stage. Exemplarily, as shown in FIGS. 3 and 4, by way of example, the first light emission control module 1071 is the PMOS-type first light emission control transistor T7, and the second light emission control module 1072 is the PMOS-type second light emission control transistor T8. In the light emission stage, the light emission control signal EM may jump into a low-level effective pulse, and the first light emission control transistor T7 and the second light emission control transistor T8 are turned on. Because the first light emission control transistor T7 is turned on, the first power signal PVDD may be transmitted to the first electrode of the drive transistor T2. In this case, the voltage difference between the first electrode of the drive transistor T2 and the gate of the drive transistor T2 is $V_{PVDD}-(V_{data}-|V_{th}|)$ so that the drive current generated by the drive transistor T2 is $K*(V_{data}-V_{PVDD})^2$. K is a coefficient related to, for example, the size and material of the drive transistor T2. With this arrangement, the drive current generated by the drive transistor T2 is unrelated to the threshold voltage $|V_{th}|$ of the drive transistor T2. The drive transistor is transmitted to the anode of the light-emitting element 11 through the second light emission control transistor T8 that is turned on so that the light-emitting element 11 emits light.

As described above, the voltage value $V_{data}$ of the data signal Vdata may control the magnitude of the drive current generated by the drive transistor T2. The magnitude of the drive current generated by the drive transistor T2 determines the final grayscale displayed by the display panel. Therefore, when a grayscale change is displayed by the display panel, the voltage value $V_{data}$ of the corresponding data signal Vdata may also change.

The data signal Vdata written by the gate of the drive transistor T2 varies with the grayscale. In the light emission process of the drive transistor T2, the potential difference between the gate of the drive transistor T2 and the first electrode of the drive transistor T2 or the second electrode of the drive transistor T2 may lead to a bias problem. That is, when the drive transistor T2 is a PMOS-type transistor, and when the drive transistor T2 is turned on but the voltage of the gate of the drive transistor T2 is greater than the voltage of the first electrode of the drive transistor T2 or the voltage of the second electrode of the drive transistor T2, the bias problem may occur. That is, when the drive transistor T2 is an NMOS-type transistor, and when the drive transistor T2 is turned on but the voltage of the gate of the drive transistor T2 is less than the voltage of the first electrode of the drive transistor T2 or the voltage of the second electrode of the drive transistor T2, the bias problem may occur. The bias problem often leads to a reverse electric field inside the drive transistor T2, resulting in carrier polarization and thereby leading to the threshold voltage drift of the drive transistor T2. The threshold voltage drift of the drive transistor T2 may affect the writing of the data signal, making the drive current generated by the drive transistor T2 unstable, and leading to a flicker problem especially when the grayscale changes.

Based on the preceding technical problem, in this embodiment, the working process of the display panel further includes the bias adjustment stage t30. As shown in FIGS. 3, 4, 7, and 8, by way of example, the bias adjustment module 105 is the PMOS-type bias adjustment transistor T4. In the bias adjustment stage t30, the bias adjustment control signal SP* is a low-level effective pulse so that the bias adjustment transistor T4 is turned on, and the bias adjustment signal V0 is input to the first electrode of the drive transistor T2 or the second electrode of the drive transistor T2 to adjust the voltage difference between the gate of the drive transistor T2 and the first electrode of the drive transistor T2 or the second electrode of the drive transistor T2, thereby eliminating the reverse electric field generated inside the drive transistor T2, solving the bias problem, avoiding the threshold voltage drift of the drive transistor T2, and thereby helping alleviate the flicker phenomenon.

Exemplarily, when the drive transistor T2 is a PMOS-type transistor, in the bias adjustment stage t30, the potential of the first electrode of the drive transistor T2 or the potential of the second electrode of the drive transistor T2 may be raised through the bias adjustment signal V0 so as to increase the voltage difference between the first electrode of the drive transistor T2 or the second electrode of the drive transistor T2 and the gate of the drive transistor T2, counteracting the reverse electric field generated inside the drive transistor T2 and solving the bias problem; however, it is not limited thereto.

With continued reference to FIGS. 3, 4, 7, and 8, in the bias adjustment stage t30, the second scan signal S2N is a high-level effective pulse so that the compensation transistor T3 is turned on. In this case, the bias adjustment signal V0 may be transmitted through the compensation transistor T3 to the gate of the drive transistor T2 so that the potential of the gate of the drive transistor T2 is consistent with the potential of the first electrode of the drive transistor T2 and/or the potential of the second electrode of the drive transistor T2, further alleviating the phenomenon of the threshold voltage drift of the drive transistor T2 and thereby alleviating the flicker phenomenon.

Additionally, when the fourth scan signal S3N controls the initialization transistor T6 to turn on, the initialization signal Vini can be transmitted to the anode of the light-emitting element 11 to initialize the anode of the light-emitting element 11, preventing the drive current supplied to the anode of the light-emitting element 11 in the previous frame from affecting the display brightness of the light-emitting element 11 in the next frame.

In an optional embodiment, the channel type of the initialization transistor T6 may be the same as the channel type of the bias adjustment transistor T4. With this arrangement, the bias adjustment control signal SP* and the fourth scan signal S3N may be the same signal so that the initialization transistor T6 and the bias adjustment transistor T4 can be turned on or off simultaneously.

It is to be understood that the type of each transistor in the pixel circuit 10 and the corresponding driving process are exemplarily described above. In this embodiment of the present disclosure, when the type of each transistor in the pixel circuit 10 changes, a driving process similar to that described above can also be performed by changing each signal received by the gate of each transistor, which is not repeated here.

Figure 9:
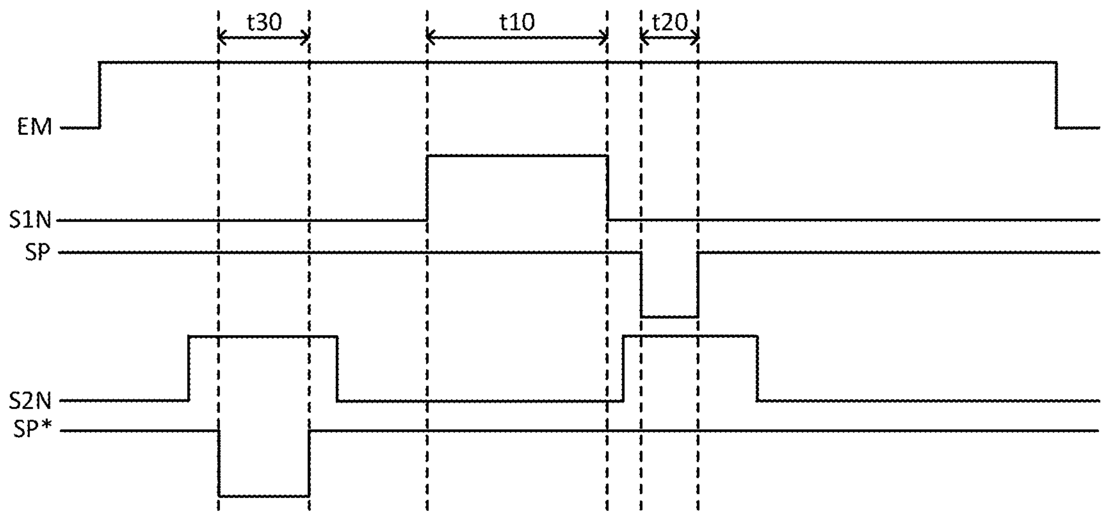
FIG. 9 is a drive timing diagram of a pixel circuit in the related art.

FIG. 9 is a drive timing diagram of a pixel circuit in the related art. As shown in FIG. 9, in a bias adjustment stage t30, a second scan signal S2N is an effective pulse, and a compensation transistor T3 is turned on once to supply a bias adjustment signal V0 to a gate of a drive transistor T2. In a data write stage t20, the second scan signal S2N is an effective pulse, and the compensation transistor T3 is turned on again to supply a data signal Vdata to the gate of the drive transistor T2. Accordingly, the compensation transistor T3 needs to be turned on twice in one image refresh frame. Then the second scan signal S2N needs to supply two effective pulses in one image refresh frame, making the driving process relatively complicated. Moreover, a driver circuit for supplying the second scan signal S2N needs to output effective pulses at a higher hopping frequency, putting forward higher requirements for the processing capacity of the driver circuit, and thereby increasing the processing complexity and processing preparation cost of the driver circuit.

Based on the preceding technical problem, with continued reference to FIGS. 3 and 7, in this embodiment of the present disclosure, the compensation module 102 is on in the bias adjustment stage t30, the data write stage t20, and the time period t40 between the bias adjustment stage t30 and the data write stage t20. In this case, the compensation module 102 keeps on after being turned on for the first time in the bias adjustment stage t30 and is turned off after the data write stage t20 of this image refresh frame ends. The compensation module 102 only needs to be turned on once in one image refresh frame. Correspondingly, the second scan signal S2N only needs to supply an effective pulse once in one image refresh frame. Compared with the related art, the second scan signal S2N is maintained as the effective pulse in the time period t40 between the bias adjustment stage t30 and the data write stage t20 and performs no hopping, thereby reducing the hopping frequency of the second scan signal S2N, simplifying the driving process, reducing requirements for the processing ability of the driver circuit supplying the second scan signal S2N, and helping reduce the processing complexity and processing preparation cost of the driver circuit.

With continued reference to FIGS. 3 and 8, in another optional embodiment, the third scan signal S1N is an effective pulse in the bias adjustment stage t30 and the reset stage t10. The reset module 103 is on. The reset signal Vref can be written to the gate (N1 node) of the drive transistor T2 to reset the drive transistor T2, clearing the data signal written to the gate of the drive transistor T2 in the previous frame and enabling the drive transistor T2 to stay in the on state.

In the bias adjustment stage t30, the reset module 103 is on, the reset signal Vref may adjust the potential of the gate of the drive transistor T2. Moreover, the bias adjustment control signal SP* is an effective pulse, and the bias adjustment module 105 is turned on. The bias adjustment signal V0 is input to the first electrode of the drive transistor T2 or the second electrode of the drive transistor T2 to adjust the potential of the first electrode of the drive transistor T2 or the potential of the second electrode of the drive transistor T2 so that the voltage difference between the gate of the drive transistor T2 and the first electrode of the drive transistor T2 or the second electrode of the drive transistor T2 is adjusted through the reset signal Vref and the bias adjustment signal V0. With this arrangement, an adjustment range of the voltage difference between the gate of the drive transistor T2 and the first electrode of the drive transistor T2 or the second electrode of the drive transistor T2 may be enlarged, better helping eliminate the reverse electric field generated inside the drive transistor T2, solving the bias problem, avoiding the threshold voltage drift of the drive transistor T2, and alleviating the flicker phenomenon.

Exemplarily, as shown in FIGS. 3 and 8, by way of example, the drive transistor T2 is a PMOS-type transistor. In the bias adjustment stage t30, the third scan signal S1N is an effective pulse, the reset module 103 is on, and the reset signal Vref is written to the gate of the drive transistor T2, thereby clearing the data signal written to the gate of the drive transistor T2 in the previous frame. Moreover, to guarantee that the drive transistor T2 is in the on state, the reset signal Vref may pull down the potential of the gate of the drive transistor T2, making the potential of the gate of the drive transistor T2 lower. Moreover, the bias adjustment control signal SP* is an effective pulse. The bias adjustment module 105 is turned on. The bias adjustment signal V0 is written to the second electrode (N3 node) of the drive transistor T2, raising the potential of the second electrode of the drive transistor T2. Therefore, a greater voltage difference is formed between the second electrode of the drive transistor T2 and the gate of the drive transistor T2, counteracting the reverse electric field generated inside the drive transistor T2 more rapidly, solving the bias problem, making the threshold voltage of the drive transistor T2 more stable, and thereby helping alleviate the flicker phenomenon.

With continued reference to FIGS. 3 and 8, in this embodiment, in the bias adjustment stage t30, the reset module 103 is on, and the potential of the gate of the drive transistor T2 is adjusted by the reset signal Vref. In this case, the compensation module 102 does not need to be turned on again. That is, the compensation module 102 is off in the bias adjustment stage t30 so that the second scan signal S2N does not need to supply an effective pulse through hopping in the bias adjustment stage t30. Therefore, in one image refresh frame, the compensation module 102 only needs to be turned on once in the data write stage t20. Correspondingly, the second scan signal S2N only needs to supply an effective pulse once in the data write stage t20, thereby reducing the hopping frequency of the second scan signal S2N, simplifying the driving process, reducing requirements for the processing ability of the driver circuit supplying the second scan signal S2N, and helping reduce the processing complexity and processing preparation cost of the driver circuit.

Figure 10:
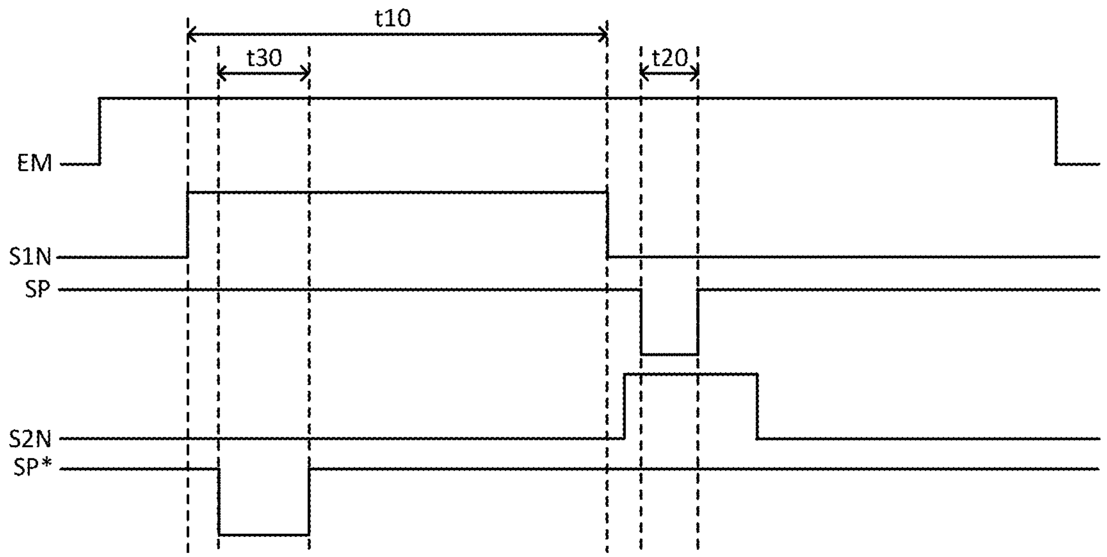
FIG. 10 is a drive timing diagram of another pixel circuit in the related art.

FIG. 10 is another drive timing diagram of a pixel circuit in the related art. As shown in FIGS. 3 and 10, an inventor found after further research that a great voltage difference exists between the second electrode of the drive transistor T2 and the gate of the drive transistor T2 after the bias adjustment stage t30 ends. By way of example, the drive transistor T2 is a PMOS-type transistor. The potential of the gate of the drive transistor T2 is low, while the second electrode (N3 node) of the drive transistor T2 is kept at a relatively high potential. As shown in FIG. 10, if the reset stage t10 is located before the start moment of the compensation module 102, that is, if the reset module 103 is turned off before the compensation module 102 is turned on, then the data write transistor T1 and the compensation transistor T3 are turned on in the data write stage t20. When the data signal Vdatais written to the gate (N1 node) of the drive transistor T2 through the second electrode (N3 node) of the drive transistor T2 from the first electrode (N2 node) of the drive transistor T2, the second electrode (N3 node) of the drive transistor T2 is at a high potential, affecting the input of the data signal Vdata, thereby not helping with the writing of the data signal Vdata to the gate (N1 node) of the drive transistor T2, and affecting the accuracy and stability of the writing of the data signal Vdata.

Based on the preceding technical problem, with continued reference to FIGS. 3 and 8, in this embodiment, the reset module 103 is set to be at least turned off after the compensation module 102 is turned on. That is, a time period (that is, the reset stage t10) when the reset module 103 is turned on overlaps a time period when the compensation module 102 is turned on. The reset module 103 and the compensation module 102 are each turned on in an overlapping period between the time period when the reset module 103 is turned on and the time period when the compensation module 102 is turned on. The reset signal Vref may be transmitted through the reset module 103 and the compensation module 102 to the second electrode (N3 node) of the drive transistor T2, thereby pulling down the potential of the second electrode of the drive transistor T2 and making the potential of the second electrode of the drive transistor T2 be the same as the potential of the gate of the drive transistor T2. In this case, in the data write stage t20, when the data signal Vdata is written to the gate (N1 node) of the drive transistor T2 from the first electrode (N2 node) of the drive transistor T2 and through the second electrode (N3 node) of the drive transistor T2. Moreover, the second electrode (N3 node) of the drive transistor T2 is at a low potential, thereby better helping with the input of the data signal Vdata and enabling the data signal Vdata to be written to the gate (N1 node) of the drive transistor T2 more accurately.

It is to be noted that an example in which the drive transistor T2 is a PMOS-type transistor is used for describing the technical solutions illustrated in the preceding FIGS. 3 and 8. In other embodiments, when the type of the drive transistor T2 changes, the driving process and beneficial effect similar to the above-mentioned driving process and beneficial effect can also be achieved by changing the potential magnitude of each signal, which is not repeated here.

Additionally, one image refresh frame may include multiple bias adjustment stages t30. The compensation module 102 may be set to be on in a portion of the bias adjustment stages t30, the data write stage t20, and a time period between the portion of the bias adjustment stages t30 and the data write stage t20. The reset module 103 may be set to be on in the other portion of the bias adjustment stages t30 and the reset stage t10, and the reset module 103 is turned off at least after the compensation module 102 is turned on to achieve the driving process and beneficial effect similar to the above-mentioned driving process and beneficial effect, which is not specifically limited by this embodiment of the present disclosure.

Above all, for the display panel according to this embodiment of the present disclosure, the compensation module is on in the bias adjustment stage, the data write stage, and the time period between the bias adjustment stage and the data write stage; moreover/alternatively, the reset module is on in the bias adjustment stage and the reset stage and is turned off at least after the compensation module is turned on. In this case, the compensation module in the pixel circuit is only turned on once in one image refresh frame. Accordingly, a scan signal for controlling the compensation transistor to turn on and off only needs to be provided with an effective pulse once in one image refresh frame, thereby reducing the hopping frequency of the scan signal, simplifying the driving process, reducing requirements for the processing ability of the driver circuit supplying the scan signal, and thereby reducing the processing complexity and processing preparation cost of the driver circuit.

Figure 11:
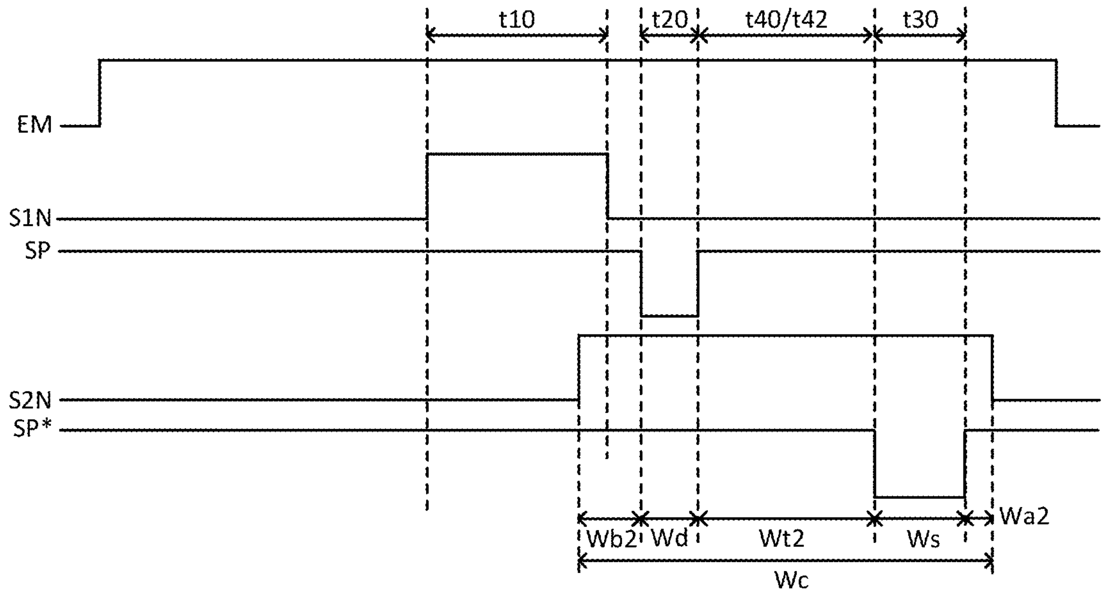
FIG. 11 is another drive timing diagram of a pixel circuit according to an embodiment of the present disclosure.

FIG. 11 is another drive timing diagram of a pixel circuit according to an embodiment of the present disclosure. As shown in FIGS. 3, 7, and 11, optionally, the compensation module 102 is on in the bias adjustment stage t30, the data write stage t20, and the time period t40 between the bias adjustment stage t30 and the data write stage t20. The time length of the bias adjustment stage t30 is Ws. The time length of the data write stage t20 is Wd. The time length of the time period when the compensation module 102 is turned on is Wc. The bias adjustment stage t30 is located before the data write stage t20. The time length of a time period t41 between an end of the bias adjustment stage t30 and a start of the data write stage t20 is Wt1, and Wc≥(Ws+Wd+Wt1). Alternatively, the bias adjustment stage t30 is located after the data write stage t20, the time length of a time period t42 between an end of the data write stage t20 and a start of the bias adjustment stage t30 is Wt2, and Wc≥(Ws+Wd+Wt2).

Specifically, as shown in FIGS. 3 and 7, in this embodiment, the bias adjustment stage t30 may be located before the data write stage t20 so as to supply the bias adjustment signal V0 to the drive transistor T2 before the data signal Vdata is written to the gate of the drive transistor T2. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby helping with the accurate writing of the data signal Vdata in the data write stage t20.

Moreover, with continued reference to FIGS. 3 and 7, the time length Wc of the time period in which the compensation module 102 is turned on is set to be minimally equal to the sum of the time length Ws of the bias adjustment stage t30, the time length Wd of the data write stage t20, and the time length Wt1 of the time period t41 between the end of the bias adjustment stage t30 and the start of the data write stage t20 so that the time length Wc of the time period in which the compensation module 102 is turned on can cover the time length Ws of the bias adjustment stage t30, the time length Wd of the data write stage t20, and the time length Wt1 of the time period t41 between the end of the bias adjustment stage t30 and the start of the data write stage t20, thereby guaranteeing that the compensation module 102 is in the on state in the bias adjustment stage t30, the data write stage t20, and the time period t41 between the end of the bias adjustment stage t30 and the start of the data write stage t20. Therefore, the driving process of the bias adjustment stage t30 and the driving process of the data write stage t20 are implemented, and the compensation module 102 only needs to be turned on once in one image refresh frame. Correspondingly, the second scan signal S2N only needs to supply an effective pulse once in one image refresh frame so that the second scan signal S2N does not need to hop in the time period t41 between the end of the bias adjustment stage t30 and the start of the data write stage t20, thereby reducing the hopping frequency of the second scan signal S2N, simplifying the driving process, reducing requirements for the processing ability of the driver circuit supplying the second scan signal S2N, and helping reduce the processing complexity and processing preparation cost of the driver circuit.

Additionally, after the hopping frequency of the second scan signal S2N is reduced, the frequency of outputting an effective pulse by the driver circuit supplying the second scan signal S2N is reduced, thereby helping reduce the electricity consumption of the driver circuit and thereby helping reduce the power consumption of the display panel.

Further, as shown in FIGS. 3 and 7, the time length Wc of the time period in which the compensation module 102 is turned on may be set to be greater than the sum of the time length Ws of the bias adjustment stage t30, the time length Wd of the data write stage t20, and the time length Wt1 of the time period t41 between the end of the bias adjustment stage t30 and the start of the data write stage t20. That is, Wc>(Ws+Wd+Wt1). Such an arrangement guarantees that the compensation module 102 is in the on state in the bias adjustment stage t30, the data write stage t20, and the time period t41 between the end of the bias adjustment stage t30 and the start of the data write stage t20. Moreover, such an arrangement enables the compensation module 102 to be turned on before the bias adjustment stage t30. That is, before the bias adjustment signal V0 is input to the drive transistor T2, the compensation module 102 is enabled to be turned, thereby guaranteeing the working stability of the compensation module 102 when the bias adjustment signal V0 is transmitted through the compensation module 102 to the gate of the drive transistor T2. Moreover, the arrangement in which Wc>(Ws+Wd+Wt1) also enables the compensation module 102 to be turned off after the data write stage t20 ends. Therefore, in the data write stage t20, that is, when the data signal Vdata is written to the gate of the drive transistor T2, it guarantees that the compensation module 102 is in the on state stably, thereby guaranteeing the accuracy and stability of the writing of the data signal Vdata.

In another optional embodiment, as shown in FIGS. 3 and 11, the bias adjustment stage t30 may also be located after the data write stage t20 so as to supply the bias adjustment signal V0 to the drive transistor T2 after the data signal Vdata is written to the gate of the drive transistor T2 and before the light-emitting element 11 enters the light emission stage. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby enabling the drive transistor T2 to be able to supply an accurate drive current to the light-emitting element 11 in a subsequent light emission stage, enabling the light-emitting element 11 to emit light accurately, and improving the display effect of the display panel.

Moreover, with continued reference to FIGS. 3 and 11, the time length Wc of the time period in which the compensation module 102 is turned on is set to be minimally equal to the sum of the time length Ws of the bias adjustment stage t30, the time length Wd of the data write stage t20, and the time length Wt2 of the time period t42 between the end of the data write stage t20 and the start of the bias adjustment stage t30 so that the time length Wc of the time period in which the compensation module 102 is turned on can cover the time length Ws of the bias adjustment stage t30, the time length Wd of the data write stage t20, and the time length Wt2 of the time period t42 between the end of the data write stage t20 and the start of the bias adjustment stage t30, thereby guaranteeing that the compensation module 102 is in the on state in the bias adjustment stage t30, the data write stage t20, and the time period t42 between the end of the data write stage t20 and the start of the bias adjustment stage t30. Therefore, the driving process of the bias adjustment stage t30 and the driving process of the data write stage t20 are implemented, and the compensation module 102 only needs to be turned on once in one image refresh frame. Correspondingly, the second scan signal S2N only needs to supply an effective pulse once in one image refresh frame so that the second scan signal S2N does not need to hop in the time period t42 between the end of the data write stage t20 and the start of the bias adjustment stage t30, thereby reducing the hopping frequency of the second scan signal S2N, simplifying the driving process, reducing requirements for the processing ability of the driver circuit supplying the second scan signal S2N, and helping reduce the processing complexity and processing preparation cost of the driver circuit.

Additionally, after the hopping frequency of the second scan signal S2N is reduced, the frequency of outputting an effective pulse by the driver circuit supplying the second scan signal S2N is reduced, helping reduce the electricity consumption of the driver circuit and thereby helping reduce the power consumption of the display panel.

Further, as shown in FIGS. 3 and 11, the time length Wc of the time period in which the compensation module 102 is turned on may be set to be greater than the sum of the time length Ws of the bias adjustment stage t30, the time length Wd of the data write stage t20, and the time length Wt2 of the time period t42 between the end of the data write stage t20 and the start of the bias adjustment stage t30. That is, Wc>(Ws+Wd+Wt2). Such an arrangement guarantees that the compensation module 102 is in the on state in the bias adjustment stage t30, the data write stage t20, and the time period t42 between the end of the data write stage t20 and the start of the bias adjustment stage t30. Moreover, such an arrangement enables the compensation module 102 to be turned on before the data write stage t20. That is, before the data signal Vdata is written to the gate of the drive transistor T2, the compensation module 102 is enabled to be turned. Therefore, in the data write stage t20, that is, when the data signal Vdata is written to the gate of the drive transistor T2, it guarantees that the compensation module 102 is in the on state stably, thereby guaranteeing the accuracy and stability of the writing of the data signal Vdata. Moreover, the arrangement in which Wc>(Ws+Wd+Wt2) also enables the compensation module 102 to be turned off after the bias adjustment stage t30 ends. That is, the compensation module 102 is turned off after the bias adjustment signal V0 is written to the drive transistor T2 completely. Therefore, when the bias adjustment signal V0 is transmitted through the compensation module 102 to the gate of the drive transistor T2, it guarantees that the compensation module 102 is in the on state stably, thereby guaranteeing the accuracy and stability of the writing of the bias adjustment signal V0.

With continued reference to FIGS. 3 and 7, optionally, the reset stage t10 is located between the bias adjustment stage t30 and the data write stage t20. The compensation module 102 is on in the reset stage t10.

Specifically, as shown in FIGS. 3 and 7, the reset stage t10 is set to be located between the bias adjustment stage t30 and the data write stage t20. In this case, the time of an effective pulse of the third scan signal S1N does not overlap the time of an effective pulse of the bias adjustment control signal SP* so that the reset stage t10 and the bias adjustment stage t30 are in different time periods and do not affect each other, thereby guaranteeing the accuracy of resetting each drive transistor T2 and the accuracy of performing a bias adjustment for each drive transistor T2. Moreover, the time of the effective pulse of the third scan signal S1N does not overlap the time of an effective pulse of the first scan signal SP so that the reset stage t10 and the data write stage t20 are in different time periods, thereby preventing the writing of the data signal Vdata from affecting the reset of the gate of the drive transistor T2, preventing the reset signal Vref from affecting the writing of the data signal Vdata, improving the accuracy of resetting the gate of the drive transistor T2, and guaranteeing that the data signal Vdata can be written to the gate of the drive transistor T2 accurately.

With continued reference to FIGS. 3 and 7, the compensation module 102 is on in the reset stage t10. On one hand, it may guarantee that the compensation module 102 only needs to be turned on once in one image refresh frame. Correspondingly, the second scan signal S2N only needs to supply an effective pulse once in one image refresh frame, thereby reducing the hopping frequency of the second scan signal S2N, simplifying the driving process, reducing requirements for the processing ability of the driver circuit supplying the second scan signal S2N, and reducing the processing complexity and processing preparation cost of the driver circuit. On the other hand, the compensation module 102 is on in the reset stage t10. The reset signal Vref may be transmitted through the reset module 103 and the compensation module 102 to the second electrode (N3 node)

of the drive transistor T2, thereby making the potential of the second electrode of the drive transistor T2 be the same as the potential of the gate of the drive transistor T2. In this case, when the data signal Vdata is written to the gate of the drive transistor T2 from the first electrode (N2 node) of the drive transistor T2 and through the second electrode (N3 node) of the drive transistor T2 in the data write stage t20, the reset signal Vref is written to the second electrode of the drive transistor T2, thereby better helping with the input of the data signal Vdata and enabling the data signal Vdata to be written to the gate of the drive transistor T2 more accurately.

With continued reference to FIGS. 3 and 7, optionally, the time length of a time period in which the reset module 103 is turned on is Wr. The bias adjustment stage t30 is located before the data write stage t20. The time length of the time period t41 between the end of the bias adjustment stage t30 and the start of the data write stage t20 is Wt1. Wr<Wt1.

The time length Wr of the time period in which the reset module 103 is turned on is the time length of the reset stage t10.

In this embodiment, as shown in FIGS. 3 and 7, the time length Wr of the time period in which the reset module 103 is turned on is set to be less than the time length Wt1 of the time period t41 between the end of the bias adjustment stage t30 and the start of the data write stage t20, thereby guaranteeing that the reset stage t10 and the bias adjustment stage t30 are in different time periods and that the reset stage t10 and the data write stage t20 are in different time periods. Moreover, an interval may exist between the time of the effective pulse of the third scan signal S1N and the time of the effective pulse of the bias adjustment control signal SP* so that the reset module 103 is turned on after the bias adjustment stage t30 ends. Therefore, in the bias adjustment stage t30, that is, when the bias adjustment signal V0 is transmitted through the compensation module 102 to the gate of the drive transistor T2, it guarantees that the reset module 103 is in the off state stably, thereby preventing the writing of the reset signal Vref from affecting the accuracy of performing a bias adjustment for the drive transistor T2.

Moreover, the arrangement in which Wr<Wt1 enables an interval to exist between the time of the effective pulse of the third scan signal S1N and the time of the effective pulse of the first scan signal SP, thereby enabling the data write module to be turned on after the reset module 103 is turned off. Therefore, before the data write stage t20, that is, before the data signal Vdata is written to the gate of the drive transistor T2, it guarantees that the gate of the drive transistor T2 is already reset and that the drive transistor T2 is already in the on state. Moreover, in the data write stage t20, that is, when the data signal Vdata is written to the gate of the drive transistor T2, it guarantees that the reset module 103 is in the off state stably, thereby preventing the writing of the reset signal Vref from affecting the writing of the data signal Vdata, improving the accuracy of resetting the gate of the drive transistor T2, and guaranteeing that the data signal Vdata can be written to the gate of the drive transistor T2 accurately.

With continued reference to FIGS. 3 and 7, optionally, the bias adjustment stage t30 is located before the data write stage t20. The time length of a time period between the turning-on of the compensation module 102 and the start of the bias adjustment stage t30 is Wb1. The time length of a time period between the end of the data write stage t20 and the turning-off of the compensation module 102 is Wa1. Wb1≥0. Moreover/alternatively, Wa1≥0.

Specifically, as shown in FIGS. 3 and 7, the bias adjustment stage t30 is located before the data write stage t20 so as to supply the bias adjustment signal V0 to the drive transistor T2 before the data signal Vdata is written to the gate of the drive transistor T2. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby helping with the accurate writing of the data signal Vdata in the data write stage t20.

Moreover, with continued reference to FIGS. 3 and 7, the time length Wb1 of the time period between the turning-on of the compensation module 102 and the start of the bias adjustment stage t30 is set to be greater than or equal to 0, thereby guaranteeing that the compensation module 102 is in the on state in the bias adjustment stage t30. Therefore, the bias adjustment signal V0 may be transmitted through the compensation transistor T3 to the gate of the drive transistor T2 so that the potential of the gate of the drive transistor T2 is consistent with the potential of the first electrode of the drive transistor T2 and/or the potential of the second electrode of the drive transistor T2, thereby alleviating the phenomenon of the threshold voltage drift of the drive transistor T2 and alleviating the flicker phenomenon.

Further, as shown in FIGS. 3 and 7, the time length Wb1 of the time period between the turning-on of the compensation module 102 and the start of the bias adjustment stage t30 may be set to be greater than 0 so that the compensation module 102 is turned on before the bias adjustment stage t30. That is, it guarantees that the compensation module 102 is already in the on state before the bias adjustment signal V0 is input to the drive transistor T2, thereby guaranteeing the working stability of the compensation module 102 when the bias adjustment signal V0 is transmitted through the compensation module 102 to the gate of the drive transistor T2.

With continued reference to FIGS. 3 and 7, in this embodiment, the time length Wa1 of the time period between the end of the data write stage t20 and the turning-off of the compensation module 102 is greater than or equal to 0, thereby guaranteeing that the compensation module 102 is in the on state in the data write stage t20. Therefore, the data signal Vdata may be transmitted through the compensation transistor T3 to the gate of the drive transistor T2.

Further, as shown in FIGS. 3 and 7, the time length Wa1 of the time period between the end of the data write stage t20 and the turning-off of the compensation module 102 may be set to be greater than 0 so that the compensation module 102 is turned off after the end of the data write stage t20. Therefore, in the data write stage t20, that is, when the data signal Vdata is written to the gate of the drive transistor T2, it guarantees that the compensation module 102 is in the on state stably, thereby guaranteeing the accuracy and stability of the writing of the data signal Vdata.

With continued reference to FIGS. 3 and 7, optionally, Wb1≠Wa1.

As shown in FIGS. 3 and 7, in the bias adjustment stage t30, the bias adjustment control signal SP* is an effective pulse, the bias adjustment module 105 is turned on, and the bias adjustment signal V0 is input to the first electrode of the drive transistor T2 or the second electrode of the drive transistor T2 to adjust the voltage difference between the gate of the drive transistor T2 and the first electrode of the drive transistor T2 or the second electrode of the drive transistor T2, thereby eliminating the reverse electric field generated inside the drive transistor T2 and solving the bias problem. Moreover, the bias adjustment signal V0 may also be transmitted through the compensation transistor T3 to the gate of the drive transistor T2 so that the potential of the gate of the drive transistor T2 is consistent with the potential of the first electrode of the drive transistor T2 and/or the potential of the second electrode of the drive transistor T2, thereby alleviating the phenomenon of the threshold voltage drift of the drive transistor T2 and alleviating the flicker phenomenon.

In the data write stage t20, the first scan signal SP is an effective pulse and the second scan signal S2N is an effective pulse, the data write module 104 and the compensation module 102 are turned on. The data signal Vdata passes through the data write module 104, the drive transistor T2, and the compensation module 102 and is written to the gate of the drive transistor T2 until the drive transistor T2 is turned off.

It can be seen that driving processes, signals written to the drive transistor T2, and required technical effects are different in the bias adjustment stage t30 and the data write stage t20. Therefore, the time length Wb1 of the time period between the turning-on of the compensation module 102 and the start of the bias adjustment stage t30 is set to be unequal to the time length Wa1 of the time period between the end of the data write stage t20 and the turning-off of the compensation module 102. Such an arrangement enables the time length Wb1 of the time period between the turning-on of the compensation module 102 and the start of the bias adjustment stage t30 and the time length Wa1 of the time period between the end of the data write stage t20 and the turning-off of the compensation module 102 to better meet the driving requirements of the bias adjustment stage t30 and the data write stage t20, makes the driving process of the pixel circuit better help with the accurate light emission of the light-emitting element 11, and improves the display effect of the display panel.

With continued reference to FIGS. 3 and 7, optionally, Wb1<Wa1.

The voltage value of the data signal Vdata written to the gate of the drive transistor T2 may affect the magnitude of the drive current generated by the drive transistor T2. The magnitude of the drive current generated by the drive transistor T2 determines the final grayscale displayed by the display panel. Therefore, it is vital to the final display effect of the display panel that the data signal Vdata is written to the gate of the drive transistor T2 accurately in the data write stage t20.

In this embodiment, as shown in FIGS. 3 and 7, the time length Wa1 of the time period between the end of the data write stage t20 and the turning-off of the compensation module 102 is relatively long. In this case, after the end of the data write stage t20, that is, after the data signal Vdata is written to the gate of the drive transistor T2, the compensation module 102 continues to be in the on state for a relatively long time, guaranteeing the accuracy and stability of the writing of the data signal Vdata.

Moreover, the time length Wb1 of the time period between the turning-on of the compensation module 102 and the start of the bias adjustment stage t30 is relatively short. Such an arrangement does not affect the bias adjustment for the drive transistor T2 in the bias adjustment stage t30 and shortens the time length Wb1 of the time period between the turning-on of the compensation module 102 and the start of the bias adjustment stage t30. Therefore, when the duration of one image refresh frame is fixed, it is helpful to prolong the light emission stage, to improve the display brightness of the display panel, and to improve the display effect.

With continued reference to FIGS. 3 and 11, optionally, the bias adjustment stage t30 is located after the data write stage t20. The time length of a time period between the turning-on of the compensation module 102 and the start of the data write stage t20 is Wb2. The time length of a time period between the end of the bias adjustment stage t30 and the turning-off of the compensation module 102 is Wa2. Wb2≥0. Moreover/alternatively, Wa2≥0.

Specifically, as shown in FIGS. 3 and 11, the bias adjustment stage t30 is located after the data write stage t20 so as to supply the bias adjustment signal V0 to the drive transistor T2 after the data signal Vdata is written to the gate of the drive transistor T2 and before the light-emitting element 11 enters the light emission stage. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby enabling the drive transistor T2 to be able to supply an accurate drive current to the light-emitting element 11 in a subsequent light emission stage, enabling the light-emitting element 11 to emit light accurately, and improving the display effect of the display panel.

As shown in FIGS. 3 and 11, the time length Wb2 of the time period between the turning-on of the compensation module 102 and the start of the data write stage t20 is set to be greater than or equal to 0, thereby guaranteeing that the compensation module 102 is in the on state in the data write stage t20. Therefore, the data signal Vdata may be transmitted through the compensation transistor T3 to the gate of the drive transistor T2.

Further, as shown in FIGS. 3 and 11, the time length Wb2 of the time period between the turning-on of the compensation module 102 and the start of the data write stage t20 may be set to be greater than 0 so that the compensation module 102 is turned on before the data write stage t20. Therefore, in the data write stage t20, that is, when the data signal Vdata is written to the gate of the drive transistor T2, it guarantees that the compensation module 102 is in the on state stably, thereby guaranteeing the accuracy and stability of the writing of the data signal Vdata.

Moreover, with continued reference to FIGS. 3 and 11, the time length Wa2 of the time period between the end of the bias adjustment stage t30 and the turning-off of the compensation module 102 is greater than or equal to 0, thereby guaranteeing that the compensation module 102 is in the on state in the bias adjustment stage t30. Therefore, the bias adjustment signal V0 may be transmitted through the compensation transistor T3 to the gate of the drive transistor T2 so that the potential of the gate of the drive transistor T2 is consistent with the potential of the first electrode of the drive transistor T2 and/or the potential of the second electrode of the drive transistor T2, thereby alleviating the phenomenon of the threshold voltage drift of the drive transistor T2 and alleviating the flicker phenomenon.

Further, as shown in FIGS. 3 and 11, the time length Wa2 of the time period between the end of the bias adjustment stage t30 and the turning-off of the compensation module 102 may be set to be greater than 0 so that the compensation module 102 is turned off after the end of the bias adjustment stage t30. Therefore, in the bias adjustment stage t30, that is, when the bias adjustment signal V0 is transmitted through the compensation module 102 to the gate of the drive transistor T2, it guarantees that the compensation module 102 is in the on state stably, thereby guaranteeing the accuracy and stability of the bias adjustment.

With continued reference to FIGS. 3 and 11, optionally, Wb2≠Wa2.

As mentioned above, driving processes, signals written to the drive transistor T2, and required technical effects are different in the bias adjustment stage t30 and the data write stage t20. Therefore, the time length Wb2 of the time period between the turning-on of the compensation module 102 and the start of the data write stage t20 is set to be unequal to the time length Wa2 of the time period between the end of the bias adjustment stage t30 and the turning-off of the compensation module 102. Such an arrangement enables the time length Wb2 of the time period between the turning-on of the compensation module 102 and the start of the data write stage t20 and the time length Wa2 of the time period between the end of the bias adjustment stage t30 and the turning-off of the compensation module 102 to better meet the driving requirements of the bias adjustment stage t30 and the data write stage t20, makes the driving process of the pixel circuit better help with the accurate light emission of the light-emitting element 11, and improves the display effect of the display panel.

With continued reference to FIGS. 3 and 11, optionally, Wb2>Wa2.

The voltage value of the data signal Vdata written to the gate of the drive transistor T2 may affect the magnitude of the drive current generated by the drive transistor T2. The magnitude of the drive current generated by the drive transistor T2 determines the final grayscale displayed by the display panel. Therefore, it is vital to the final display effect of the display panel that the data signal Vdata is written to the gate of the drive transistor T2 accurately in the data write stage t20.

In this embodiment, as shown in FIGS. 3 and 11, the time length Wb2 of the time period between the turning-on of the compensation module 102 and the start of the data write stage t20 is relatively long. In this case, before the data write stage t20, that is, before the data signal Vdata is written to the gate of the drive transistor T2, the compensation module 102 is in the on state for a relatively long time. Therefore, in the data write stage t20, that is, when the data signal Vdata is written to the gate of the drive transistor T2, it guarantees that the compensation module 102 is in the on state stably, thereby guaranteeing the accuracy and stability of the writing of the data signal Vdata.

Moreover, the time length Wa2 of the time period between the end of the bias adjustment stage t30 and the turning-off of the compensation module 102 is relatively short. Such an arrangement does not affect the bias adjustment for the drive transistor T2 in the bias adjustment stage t30 and shortens the time length Wa2 of the time period between the end of the bias adjustment stage t30 and the turning-off of the compensation module 102. Therefore, when the duration of one image refresh frame is fixed, it is helpful to prolong the light emission stage, to improve the display brightness of the display panel, and to improve the display effect.

With continued reference to FIGS. 3 and 8, optionally, the reset module 103 is on in the bias adjustment stage t30 and the reset stage t10 and is turned off at least after the compensation module 102 is turned on. The time length of the bias adjustment stage t30 is Ws. A time length of a time period between the end of the bias adjustment stage t30 and the turning-on of the compensation module 102 is Wt3. The time length of the reset stage t10 is Wr. Wr≥(Ws+Wt3).

As shown in FIGS. 3 and 8, in the bias adjustment stage t30, the third scan signal S1N is an effective pulse, the reset module 103 is on, and the reset signal Vref may adjust the potential of the gate of the drive transistor T2. Moreover, the bias adjustment control signal SP* is an effective pulse, and the bias adjustment module 105 is turned on. The bias adjustment signal V0 is input to the first electrode of the drive transistor T2 or the second electrode of the drive transistor T2 to adjust the potential of the first electrode of the drive transistor T2 or the potential of the second electrode of the drive transistor T2 so that the voltage difference between the gate of the drive transistor T2 and the first electrode of the drive transistor T2 or the second electrode of the drive transistor T2 is adjusted through the reset signal Vref and the bias adjustment signal V0. With this arrangement, the adjustment range of the voltage difference between the gate of the drive transistor T2 and the first electrode of the drive transistor T2 or the second electrode of the drive transistor T2 may be enlarged, thereby better helping eliminate the reverse electric field generated inside the drive transistor T2, solving the bias problem, avoiding the threshold voltage drift of the drive transistor T2, and alleviating the flicker phenomenon.

Moreover, in the bias adjustment stage t30, the reset module 103 is on, and the potential of the gate of the drive transistor T2 is adjusted by the reset signal Vref. In this case, the compensation module 102 does not need to be turned on again. That is, the compensation module 102 keeps off in the bias adjustment stage t30 so that the second scan signal S2N does not need to supply an effective pulse through hopping in the bias adjustment stage t30. Therefore, in one image refresh frame, the compensation module 102 only needs to be turned on once in the data write stage t20. Correspondingly, the second scan signal S2N only needs to supply an effective pulse once in the data write stage t20, thereby reducing the hopping frequency of the second scan signal S2N, simplifying the driving process, reducing requirements for the processing ability of the driver circuit supplying the second scan signal S2N, and helping reduce the processing complexity and processing preparation cost of the driver circuit.

Further, as shown in FIGS. 3 and 8, the time length Wr of the reset stage t10 is set to be minimally equal to the sum of the time length Ws of the bias adjustment stage t30 and the time period Wt3 between the end of the bias adjustment stage t30 and the turning-on of the compensation module 102 so that the time length Wr of the reset stage t10 can cover the time length Ws of the bias adjustment stage t30 and the time period Wt3 between the end of the bias adjustment stage t30 and the turning-on of the compensation module 102, thereby guaranteeing that the reset module 103 is in the on state in the bias adjustment stage t30 and the reset stage t10. Therefore, when the driving process of the bias adjustment stage t30 and the driving process of the reset stage t10 are implemented, the reset module 103 only needs to be turned on once in one image refresh frame. Correspondingly, the third scan signal S1N only needs to supply an effective pulse once in one image refresh frame, thereby preventing the hopping frequency of the third scan signal S1N from rising, and making the processing complexity and processing preparation cost of the driver circuit supplying the third scan signal S1N relatively low.

Further, as shown in FIGS. 3 and 8, the time length Wr of the reset stage t10 may be set to be greater than the sum of the time length Ws of the bias adjustment stage t30 and the time period Wt3 between the end of the bias adjustment stage t30 and the turning-on of the compensation module 102. That is, Wr>(Ws+Wt3). Such an arrangement guarantees that the reset module 103 is in the on state in the bias adjustment stage t30 and the reset stage t10. Moreover, such an arrangement enables the reset module 103 to be turned on before the bias adjustment stage t30. That is, before the bias adjustment signal V0 is input to the drive transistor T2, the reset signal Vref is already written to the gate of the drive transistor T2 so that the drive transistor T2 is in the on state stably. Therefore, when the bias adjustment signal V0 is input to the drive transistor T2, it may guarantee that the potential of the first electrode of the drive transistor T2 and the potential of the second electrode of the drive transistor T2 are consistent with the potential of the bias adjustment signal V0, thereby alleviating the phenomenon of the threshold voltage drift due to the relatively great potential difference among the gate of the drive transistor T2, the first electrode of the drive transistor T2, and the second electrode of the drive transistor T2, solving the bias problem, and alleviating the flicker phenomenon.

Moreover, as shown in FIGS. 3 and 8, the arrangement in which Wr>(Ws+Wt3) may also guarantee that the reset module 103 is turned off after the compensation module 102 is turned on so that the time period (that is, the reset stage t10) in which the reset module 103 is turned on overlaps the time period in which the compensation module 102 is turned on. The reset module 103 and the compensation module 102 are each turned on in the overlapping period between the time period in which the reset module 103 is turned on and the time period in which the compensation module 102 is turned on. The reset signal Vref may be transmitted through the reset module 103 and the compensation module 102 to the second electrode (N3 node) of the drive transistor T2, thereby adjusting the potential of the second electrode of the drive transistor T2 and making the potential of the second electrode of the drive transistor T2 be the same as the potential of the gate of the drive transistor T2. In this manner, when the data signal Vdata is written to the gate (N1 node) of the drive transistor T2 from the first electrode (N2 node) of the drive transistor T2 and through the second electrode (N3 node) of the drive transistor T2 in the data write stage t20, the potential of the second electrode (N3 node) of the drive transistor T2 is the same as the potential of the gate of the drive transistor T2, thereby better helping with the input of the data signal Vdata and thereby enabling the data signal Vdata to be written to the gate of the drive transistor T2 more accurately.

With continued reference to FIGS. 3 and 8, optionally, the time length of a time period in which the reset stage t10 overlaps the time period when the compensation module 102 is turned on is Wt4. Wr≥(Ws+Wt3+Wt4).

Specifically, as shown in FIGS. 3 and 8, the time length Wr of the reset stage t10 is set to be minimally equal to the sum of the time length Ws of the bias adjustment stage t30, the time period Wt3 between the end of the bias adjustment stage t30 and the turning-on of the compensation module 102, and the time length Wt4 of the time period overlapping between the reset stage t10 and the time period in which the compensation module 102 is turned on, so that the time length Wr of the reset stage t10 can cover the time length Ws of the bias adjustment stage t30, the time period Wt3 between the end of the bias adjustment stage t30 and the turning-on of the compensation module 102, and the time length Wt4 of the time period overlapping between the reset stage t10 and the time period in which the compensation module 102 is turned on, thereby guaranteeing that the reset module 103 is in the on state in the bias adjustment stage t30, the time period Wt3 between the end of the bias adjustment stage t30 and the turning-on of the compensation module 102, and the time period overlapping between the reset stage t10 and the time period in which the compensation module 102 is turned on. Therefore, when the driving process of the bias adjustment stage t30, the driving process of the reset stage t10, and the driving process of the time period overlapping between the reset stage t10 and the time period in which the compensation module 102 is turned on are implemented, the reset module 103 only needs to be turned on once in one image refresh frame. Correspondingly, the third scan signal S1N only needs to supply an effective pulse once in one image refresh frame, thereby preventing the hopping frequency of the third scan signal S1N from rising, and making the processing complexity and processing preparation cost of the driver circuit supplying the third scan signal S1N relatively low.

With continued reference to FIGS. 3 and 8, optionally, the time length of a time period between a start of the reset stage t10 and the start of the bias adjustment stage t30 is Wb3. Wb3≥0.

As shown in FIGS. 3 and 8, the time length Wb3 of the time period between the start of the reset stage t10 and the start of the bias adjustment stage t30 is greater than or equal to 0, thereby guaranteeing that the reset module 103 is in the on state in the bias adjustment stage t30. In this case, the bias adjustment signal V0 is written to the first electrode of the drive transistor T2 or the second electrode of the drive transistor T2, and the reset signal Vref is written to the gate of the drive transistor T2. Therefore, the voltage difference between the gate of the drive transistor T2 and the first electrode of the drive transistor T2 or the second electrode of the drive transistor T2 is adjusted through the reset signal Vref and the bias adjustment signal V0, eliminating the reverse electric field generated inside the drive transistor T2, solving the bias problem, reducing the threshold voltage drift of the drive transistor T2, and alleviating the flicker phenomenon.

Further, as shown in FIGS. 3 and 8, the time length Wb3 of the time period between the start of the reset stage t10 and the start of the bias adjustment stage t30 may be set to be greater than 0 so that the reset module 103 is turned on before the bias adjustment stage t30. Therefore, before the bias adjustment signal V0 is input to the drive transistor T2, the drive transistor T2 is in the on state stably. When the bias adjustment signal V0 is input to the drive transistor T2, it may guarantee that the potential of the first electrode of the drive transistor T2 and the potential of the second electrode of the drive transistor T2 are consistent with the potential of the bias adjustment signal V0, thereby alleviating the phenomenon of the threshold voltage drift due to the relatively great potential difference among the gate of the drive transistor T2, the first electrode of the drive transistor T2, and the second electrode of the drive transistor T2, solving the bias problem, and alleviating the flicker phenomenon.

With continued reference to FIGS. 3 and 8, optionally, Wb3≠Wt4.

As shown in FIGS. 3 and 8, the reset signal Vref may be transmitted through the reset module 103 and the compensation module 102 to the second electrode (N3 node) of the drive transistor T2 in the time period overlapping between the reset stage t10 and the time period in which the compensation module 102 is turned on, thereby adjusting the potential of the second electrode of the drive transistor T2 and making the potential of the second electrode of the drive transistor T2 be the same as the potential of the gate of the drive transistor T2. In this case, when the data signal Vdata is written to the gate (N1 node) of the drive transistor T2 from the first electrode (N2 node) of the drive transistor T2 and through the second electrode (N3 node) of the drive transistor T2 in the data write stage t20, the potential of the second electrode (N3 node) of the drive transistor T2 is the same as the potential of the gate of the drive transistor T2, thereby better helping with the input of the data signal Vdata and thereby enabling the data signal Vdata to be written to the gate of the drive transistor T2 more accurately.

In the time period between the start of the reset stage t10 and the start of the bias adjustment stage t30, the reset module 103 is turned on before the bias adjustment stage t30. Therefore, before the bias adjustment signal V0 is input to the drive transistor T2, the drive transistor T2 is in the on state. When the bias adjustment signal V0 is input to the drive transistor T2, it may guarantee that the potential of the first electrode of the drive transistor T2 and the potential of the second electrode of the drive transistor T2 are consistent with the potential of the bias adjustment signal V0, thereby alleviating the phenomenon of the threshold voltage drift due to the relatively great potential difference among the gate of the drive transistor T2, the first electrode of the drive transistor T2, and the second electrode of the drive transistor T2, solving the bias problem, and alleviating the flicker phenomenon.

It can be seen that driving processes and required technical effects are different in the time period overlapping between the reset stage t10 and the time period in which the compensation module 102 is turned on and the time period between the start of the reset stage t10 and the start of the bias adjustment stage t30. Therefore, the time length Wb3 of the time period between the start of the reset stage t10 and the start of the bias adjustment stage t30 is set to be unequal to the time length Wt4 of the time period overlapping between the reset stage t10 and the time period in which the compensation module 102 is turned on. Such an arrangement enables the time length Wb3 of the time period between the start of the reset stage t10 and the start of the bias adjustment stage t30 and the time length Wt4 of the time period overlapping between the reset stage t10 and the time period in which the compensation module 102 is turned on to better meet the driving requirements of the time period overlapping between the reset stage t10 and the time period in which the compensation module 102 is turned on and the driving requirements of the time period between the start of the reset stage t10 and the start of the bias adjustment stage t30, thereby making the driving process of the pixel circuit better help with the accurate light emission of the light-emitting element 11, and improving the display effect of the display panel.

With continued reference to FIGS. 3 and 8, optionally, Wb3≤Wt4.

In the time period overlapping between the reset stage t10 and the time period in which the compensation module 102 is turned on, the potential of the second electrode of the drive transistor T2 adjusted by the reset signal Vref may affect the accuracy of the data signal Vdata written to the gate of the drive transistor T2 in the data write stage t20. The data signal Vdata written to the gate of the drive transistor T2 may affect the magnitude of the drive current generated by the drive transistor T2, thereby affecting the grayscale finally displayed by the display panel. Therefore, in the time period overlapping between the reset stage t10 and the time period in which the compensation module 102 is turned on, the effect of the reset signal Vref written to the second electrode of the drive transistor T2 may affect the final display effect of the display panel.

In this embodiment, as shown in FIGS. 3 and 8, the arrangement in which the time length Wt4 of the time period overlapping between the reset stage t10 and the time period in which the compensation module 102 is turned on is minimally equal to the time length Wb3 of the time period between the start of the reset stage t10 and the start of the bias adjustment stage t30 guarantees that the time period overlapping between the reset stage t10 and the time period in which the compensation module 102 is turned on has enough time length, guarantees that the potential of the second electrode of the drive transistor T2 is consistent with the potential of the reset signal Vref, and thereby enables the data signal Vdata to be written to the gate of the drive transistor T2 more accurately in the data write stage t20.

Further, with continued reference to FIGS. 3 and 8, the time length Wb3 of the time period between the start of the reset stage t10 and the start of the bias adjustment stage t30 may be set to be less than the time length Wt4 of the time period overlapping between the reset stage t10 and the time period in which the compensation module 102 is turned on. Such an arrangement does not affect the bias adjustment for the drive transistor T2 in the bias adjustment stage t30 and shortens the time length Wb3 of the time period between the start of the reset stage t10 and the start of the bias adjustment stage t30. Therefore, when the duration of one image refresh frame is fixed, it is helpful to prolong the light emission stage, to improve the display brightness of the display panel, and to improve the display effect.

With continued reference to FIGS. 3 to 6, optionally, the reset module 103 is connected to the gate (N1 node) of the drive transistor T2. The data write module 104 is connected to the first electrode (N2 node) of the drive transistor T2. The bias adjustment module 105 is connected to the first electrode (N2 node) of the drive transistor T2 or the second electrode (N3 node) of the drive transistor T2.

Specifically, as shown in FIGS. 3 to 6, the reset module 103 may be connected to the gate (N1 node) of the drive transistor T2 and configured to supply the reset signal Vref to the gate of the drive transistor T2.

Exemplarily, as shown in FIGS. 3 and 7, the third scan signal S1N is an effective pulse in the reset stage t10. The reset module 103 is turned on. The reset signal Vref is transmitted to the gate (N1 node) of the drive transistor T2 through the reset module 103 that is turned on, thereby resetting the gate of the drive transistor T2. In this case, the potential of the gate (N1 node) of the drive transistor T2 is consistent with the potential of the reset signal Vref to prevent a data signal of the previous frame carried on the gate of the drive transistor T2 from affecting the writing of a data signal of the next frame.

The data write module 104 may be connected to the first electrode (N2 node) of the drive transistor T2 and configured to supply the data signal Vdata to the drive transistor T2.

Exemplarily, as shown in FIGS. 3 and 7, in the data write stage t20, the first scan signal SP is an effective pulse, and the second scan signal S2N is an effective pulse. The data write module 104 and the compensation module 102 are turned on. The data signal Vdata passes through the data write module 104, the drive transistor T2, and the compensation module 102 and is written to the gate (N1 node) of the drive transistor T2.

The bias adjustment module 105 may be connected to the first electrode (N2 node) of the drive transistor T2 or the second electrode (N3 node) of the drive transistor T2 and configured to supply the bias adjustment signal V0 to the drive transistor T2.

Exemplarily, as shown in FIGS. 3 and 7, in the bias adjustment stage t30, the bias adjustment control signal SP* is an effective pulse, the bias adjustment module 105 is turned on. The bias adjustment signal V0 is input to the first electrode of the drive transistor T2 or the second electrode of the drive transistor T2 to adjust the voltage difference between the gate of the drive transistor T2 and the first electrode of the drive transistor T2 or the second electrode of the drive transistor T2, thereby eliminating the reverse electric field generated inside the drive transistor T2, solving the bias problem, avoiding the threshold voltage drift of the drive transistor T2, and helping alleviate the flicker phenomenon.

As shown in FIGS. 3 and 4, when the drive transistor T2 is a PMOS-type transistor, the first electrode of the storage capacitor C1 in the pixel circuit 10 is connected to the first power signal terminal. The second electrode of the storage capacitor C1 in the pixel circuit 10 is connected to the gate of the drive transistor T2 and configured to store the signals transmitted to the gate of the drive transistor T2. In this case, as shown in FIG. 3, the bias adjustment module 105 may be connected to the first electrode of the drive transistor T2, that is, the N2 node. In another optional embodiment, as shown in FIG. 4, the bias adjustment module 105 may also be connected to the second electrode of the drive transistor T2, that is, the N3 node.

As shown in FIGS. 5 and 6, when the drive transistor T2 is an NMOS-type transistor, the first electrode of the storage capacitor C1 in the pixel circuit 10 is connected to the light-emitting element 11. The second electrode of the storage capacitor C1 in the pixel circuit 10 is connected to the gate of the drive transistor T2 and configured to store the signals transmitted to the gate of the drive transistor T2. In this case, as shown in FIG. 5, the bias adjustment module 105 may be connected to the first electrode of the drive transistor T2, that is, the N2 node. In another optional embodiment, as shown in FIG. 6, the bias adjustment module 105 may also be connected to the second electrode of the drive transistor T2, that is, the N3 node.

With continued reference to FIGS. 3 to 8, optionally, when the compensation module 102 is turned on, the bias adjustment module 105 transmits the bias adjustment signal V0 to the gate of the drive transistor T2 in the bias adjustment stage t30. When the compensation module 102 is turned off, the bias adjustment module 105 transmits the bias adjustment signal V0 to the first electrode of the drive transistor T2 and/or the second electrode of the drive transistor T2 in the bias adjustment stage t30.

As shown in FIGS. 3 and 7, in the bias adjustment stage t30, the compensation module 102 is turned on, the bias adjustment module 105 may transmit the bias adjustment signal V0 through the compensation module 102 to the gate of the drive transistor T2 so that the potential of the gate of the drive transistor T2 is consistent with the potential of the first electrode of the drive transistor T2 and/or the potential of the second electrode of the drive transistor T2, thereby eliminating the reverse electric field generated inside the drive transistor T2, solving the bias problem, alleviating the phenomenon of the threshold voltage drift of the drive transistor T2, and alleviating the flicker phenomenon.

In another optional embodiment, as shown in FIGS. 3 and 8, in the bias adjustment stage t30, the compensation module 102 is turned off, the bias adjustment module 105 may transmit the bias adjustment signal V0 to the first electrode of the drive transistor T2 and/or the second electrode of the drive transistor T2 to adjust the potential of the first electrode of the drive transistor T2 and/or the potential of the second electrode of the drive transistor T2, thereby adjusting the voltage difference between the gate of the drive transistor T2 and the first electrode of the drive transistor T2 or the second electrode of the drive transistor T2, eliminating the reverse electric field generated inside the drive transistor T2, solving the bias problem, alleviating the phenomenon of the threshold voltage drift of the drive transistor T2, and alleviating the flicker phenomenon.

Figure 12:
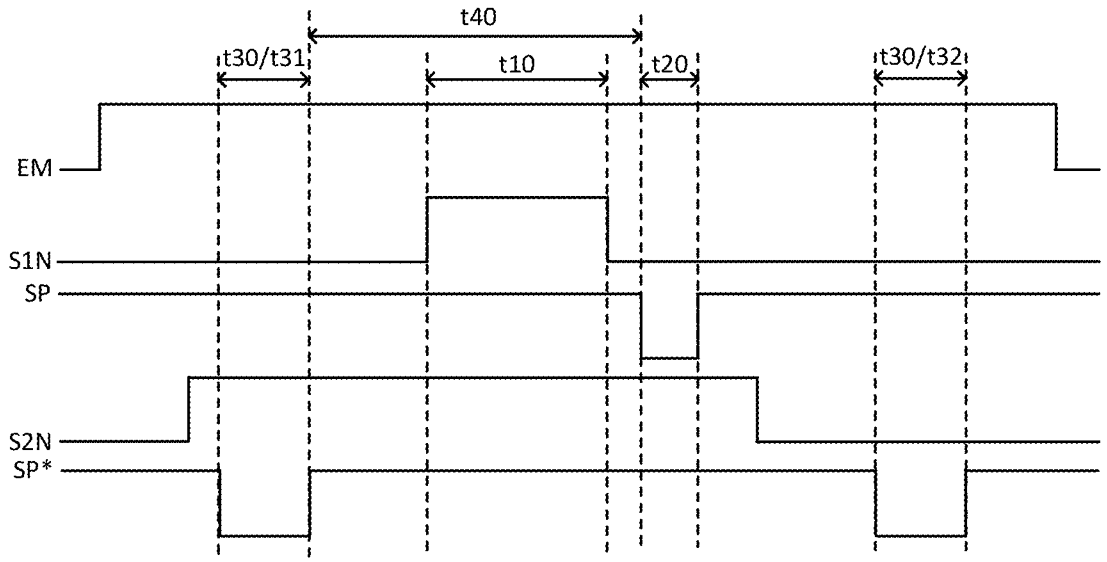
FIG. 12 is another drive timing diagram of a pixel circuit according to an embodiment of the present disclosure.

FIG. 12 is another drive timing diagram of a pixel circuit according to an embodiment of the present disclosure. As shown in FIGS. 3 and 12, optionally, the bias adjustment stage t30 includes a first bias adjustment stage t31 and a second bias adjustment stage t32. The first bias adjustment stage t31 is located before the data write stage t20. The second bias adjustment stage t32 is located after the data write stage t20. The compensation module 102 is on in the first bias adjustment stage t31, the data write stage t20, and a time period t40 between the first bias adjustment stage t31 and the data write stage t20.

As shown in FIGS. 3 and 12, the first bias adjustment stage t31 is located before the data write stage t20 so as to supply the bias adjustment signal V0 to the drive transistor T2 before the data signal Vdata is written to the gate of the drive transistor T2. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby helping with the accurate writing of the data signal Vdata in the data write stage t20.

The second bias adjustment stage t32 is located after the data write stage t20 so as to supply the bias adjustment signal V0 to the drive transistor T2 after the data signal Vdata is written to the gate of the drive transistor T2 and before the light-emitting element 11 enters the light emission stage. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby enabling the drive transistor T2 to be able to supply an accurate drive current to the light-emitting element 11 in a subsequent light emission stage, enabling the light-emitting element 11 to emit light accurately, and improving the display effect of the display panel.

Further, as shown in FIGS. 3 and 12, the compensation module 102 is on in the first bias adjustment stage t31, the data write stage t20, and the time period t40 between the first bias adjustment stage t31 and the data write stage t20. In this case, the compensation module 102 keeps on after being turned on for the first time in the first bias adjustment stage t31 and is turned off after the data write stage t20 of this image refresh frame ends. The compensation module 102 only needs to be turned on once in one image refresh frame. Correspondingly, the second scan signal S2N only needs to supply an effective pulse once in one image refresh frame, thereby reducing the hopping frequency of the second scan signal S2N, simplifying the driving process, reducing requirements for the processing ability of the driver circuit supplying the second scan signal S2N, and helping reduce the processing complexity and processing preparation cost of the driver circuit.

It is to be noted that as shown in FIGS. 3 and 12, the compensation module 102 is turned on in the first bias adjustment stage t31. The bias adjustment module 105 may transmit the bias adjustment signal V0 through the compensation module 102 to the gate of the drive transistor T2 so that the potential of the gate of the drive transistor T2 is consistent with the potential of the first electrode of the drive transistor T2 and/or the potential of the second electrode of the drive transistor T2, thereby eliminating the reverse electric field generated inside the drive transistor T2, solving the bias problem, alleviating the phenomenon of the threshold voltage drift of the drive transistor T2, and alleviating the flicker phenomenon.

The compensation module 102 is turned off in the second bias adjustment stage t32. The bias adjustment module 105 may transmit the bias adjustment signal V0 to the first electrode of the drive transistor T2 and/or the second electrode of the drive transistor T2 to adjust the potential of the first electrode of the drive transistor T2 and/or the potential of the second electrode of the drive transistor T2, thereby adjusting the voltage difference between the gate of the drive transistor T2 and the first electrode of the drive transistor T2 or the second electrode of the drive transistor T2, eliminating the reverse electric field generated inside the drive transistor T2, solving the bias problem, alleviating the phenomenon of the threshold voltage drift of the drive transistor T2, and alleviating the flicker phenomenon.

Figure 13:
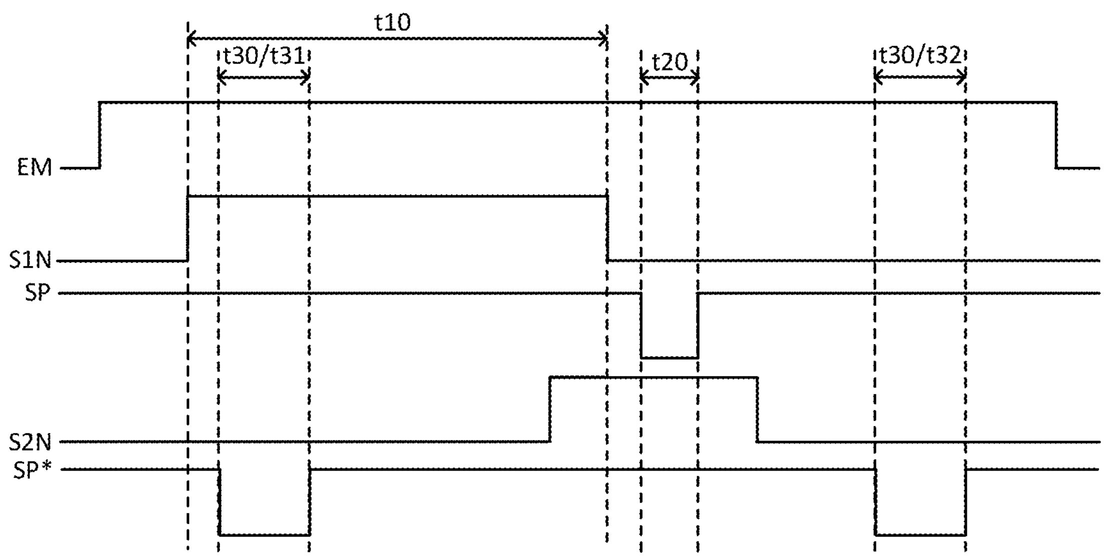
FIG. 13 is another drive timing diagram of a pixel circuit according to an embodiment of the present disclosure.

FIG. 13 is another drive timing diagram of a pixel circuit according to an embodiment of the present disclosure. As shown in FIGS. 3 and 13, optionally, the bias adjustment stage t30 includes a first bias adjustment stage t31 and a second bias adjustment stage t32. The first bias adjustment stage t31 is located before the data write stage t20. The second bias adjustment stage t32 is located after the data write stage t20. The reset module 103 is on in the first bias adjustment stage t31 and the reset stage t10 and is turned off at least after the compensation module 102 is turned on.

As shown in FIGS. 3 and 13, the first bias adjustment stage t31 is located before the data write stage t20 so as to supply the bias adjustment signal V0 to the drive transistor T2 before the data signal Vdata is written to the gate of the drive transistor T2. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby helping with the accurate writing of the data signal Vdata in the data write stage t20.

The second bias adjustment stage t32 is located after the data write stage t20 so as to supply the bias adjustment signal V0 to the drive transistor T2 after the data signal Vdata is written to the gate of the drive transistor T2 and before the light-emitting element 11 enters the light emission stage. The bias adjustment signal V0 may adjust the voltage difference between the gate of the drive transistor T2 and the first electrode of the drive transistor T2 or the second electrode of the drive transistor T2 so as to alleviate the phenomenon of the threshold voltage drift due to the relatively great potential difference among the gate of the drive transistor T2, the first electrode of the drive transistor T2, and the second electrode of the drive transistor T2, thereby enabling the drive transistor T2 to be able to supply an accurate drive current to the light-emitting element 11 in a subsequent light emission stage, enabling the light-emitting element 11 to emit light accurately, and improving the display effect of the display panel.

Further, as shown in FIGS. 3 and 13, the third scan signal S1N is an effective pulse in the first bias adjustment stage t31 and the reset stage t10. The reset module 103 is on. The reset signal Vref is written to the gate (N1 node) of the drive transistor T2 to adjust the potential of the gate of the drive transistor T2. Moreover, the bias adjustment control signal SP* is an effective pulse, the bias adjustment module 105 is turned on. The bias adjustment signal V0 is input to the first electrode of the drive transistor T2 or the second electrode of the drive transistor T2 to adjust the potential of the first electrode of the drive transistor T2 or the potential of the second electrode of the drive transistor T2 so that the voltage difference between the gate of the drive transistor T2 and the first electrode of the drive transistor T2 or the second electrode of the drive transistor T2 is adjusted through the reset signal Vref and the bias adjustment signal V0. With this arrangement, the adjustment range of the voltage difference between the gate of the drive transistor T2 and the first electrode of the drive transistor T2 or the second electrode of the drive transistor T2 may be enlarged, thereby helping eliminate the reverse electric field generated inside the drive transistor T2, solving the bias problem, alleviating the phenomenon of the threshold voltage drift of the drive transistor T2, and alleviating the flicker phenomenon.

Moreover, the reset module 103 is turned off at least after the compensation module 102 is turned on. That is, the time period (that is, the reset stage t10) in which the reset module 103 is turned on overlaps the time period in which the compensation module 102 is turned on. The reset module 103 and the compensation module 102 are each turned on in the time period overlapping between the time period in which the reset module 103 is turned on and the time period in which the compensation module 102 is turned on. The reset signal Vref may be transmitted through the reset module 103 and the compensation module 102 to the second electrode (N3 node) of the drive transistor T2, thereby making the potential of the second electrode of the drive transistor T2 consistent with the potential of the reset signal Vref. In this manner, when the data signal Vdata is written to the gate (N1 node) of the drive transistor T2 from the first electrode (N2 node) of the drive transistor T2 and through the second electrode (N3 node) of the drive transistor T2 in the data write stage t20, the potential of the second electrode of the drive transistor T2 is consistent with the potential of the reset signal Vref, thereby better helping with the input of the data signal Vdata and enabling the data signal Vdata to be written to the gate of the drive transistor T2 more accurately.

It is to be noted that as shown in FIGS. 3 and 13, the compensation module 102 is turned off in the first bias adjustment stage t31 and the second bias adjustment stage t32. The bias adjustment module 105 may transmit the bias adjustment signal V0 to the first electrode of the drive transistor T2 and/or the second electrode of the drive transistor T2 to adjust the potential of the first electrode of the drive transistor T2 and/or the potential of the second electrode of the drive transistor T2, thereby adjusting the voltage difference between the gate of the drive transistor T2 and the first electrode of the drive transistor T2 or the second electrode of the drive transistor T2, eliminating the reverse electric field generated inside the drive transistor T2, solving the bias problem, alleviating the phenomenon of the threshold voltage drift of the drive transistor T2, and alleviating the flicker phenomenon.

Figure 14:
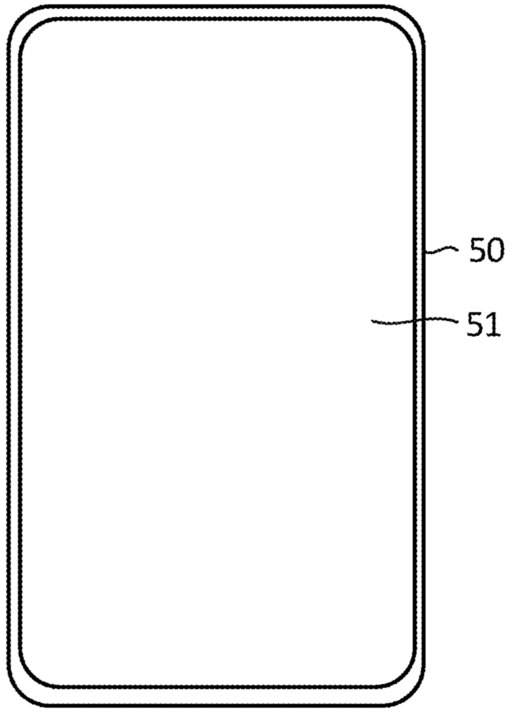
FIG. 14 is a structural diagram of a display device according to an embodiment of the present disclosure.

Based on the same inventive concept, an embodiment of the present disclosure disclosure provides a display device. FIG. 14 is a structural diagram of a display device according to an embodiment of the present disclosure. As shown in FIG. 14, the display device 50 includes the display panel 51 according to any embodiment of the present disclosure. Therefore, the display device 50 according to this embodiment of the present disclosure has the technical effects of the technical solution of any one of the embodiments described above, and structures which are the same as or correspond to the structures in the embodiments described above and the explanation of the term will not be repeated herein.

The display device 50 according to this embodiment of the present disclosure may be the cellphone shown in FIG. 14 or may be any other electronic product having a display function. The electronic product includes, but is not limited to, a television set, a laptop, a desktop display, a tablet, a digital camera, a smart bracelet, smart glasses, an in-vehicle display, a medical device, an industrial control device, or a touch interactive terminal. The electronic product is not specially limited in this embodiment of the present disclosure.

It is to be understood that various forms of processes shown in the preceding may be adopted with steps reordered, added, or deleted. For example, the steps described in the present disclosure may be performed in parallel, sequentially, or in different orders, as long as the desired results of technical solutions of the present disclosure can be achieved, and no limitation is imposed herein.

The preceding embodiments do not limit the scope of the present disclosure. It is to be understood by those skilled in the art that various modifications, combinations, sub-combinations, and substitutions may be performed according to design requirements and other factors. Any modification, equivalent substitution, improvement, or the like made within the spirit and principle of the present disclosure is within the scope of the present disclosure.

What is claimed is:

1. A display panel, comprising:

a pixel circuit and a light-emitting element;

wherein the pixel circuit comprises a drive module, a compensation module, a reset module, a data write module, and a bias adjustment module;

the drive module comprises a drive transistor; the drive transistor comprises a gate, a first electrode, and a second electrode; and the compensation module is connected between the gate of the drive transistor and the second electrode of the drive transistor;

a working process of the display panel comprises a reset stage, a data write stage, and a bias adjustment stage;

the reset module is configured to supply a reset signal to the drive transistor in the reset stage;

the data write module is configured to supply a data signal to the drive transistor in the data write stage; and in the bias adjustment stage, the bias adjustment module is turned on and is configured to supply a bias adjustment signal to the drive transistor;

wherein the display panel satisfies at least one of the following:

the compensation module is on in the bias adjustment stage, the data write stage, and a time period between the bias adjustment stage and the data write stage; or the reset module is on in the bias adjustment stage and the reset stage and is turned off at least after the compensation module is turned on, and a time period in which the reset module is turned on overlaps a time period in which the compensation module is turned on.

2. The display panel according to claim 1, wherein the compensation module is on in the bias adjustment stage, the data write stage, and the time period between the bias adjustment stage and the data write stage; and a time length of the bias adjustment stage is Ws, a time length of the data write stage is Wd, and a time length of the time period in which the compensation module is turned on is Wc, wherein the bias adjustment stage is located before the data write stage, a time length of a time period between an end of the bias adjustment stage and a start of the data write stage is Wt1, and Wc≥(Ws+Wd+Wt1); or the bias adjustment stage is located after the data write stage, a time length of a time period between an end of the data write stage and a start of the bias adjustment stage is Wt2, and Wc≥(Ws+Wd+Wt2).

3. The display panel according to claim 2, wherein the reset stage is located between the bias adjustment stage and the data write stage, and the compensation module is on in the reset stage.

4. The display panel according to claim 3, wherein a time length of the time period in which the reset module is turned on is Wr; and the bias adjustment stage is located before the data write stage, and the time length of the time period between the end of the bias adjustment stage and the start of the data write stage is Wt1;

wherein Wr<Wt1.

5. The display panel according to claim 2, wherein the bias adjustment stage is located before the data write stage; and a time length of a time period between turning-on of the compensation module and the start of the bias adjustment stage is Wb1, and a time length of a time period between the end of the data write stage and turning-off of the compensation module is Wa1;

wherein Wb1≥0, and/or Wa1≥0.

6. The display panel according to claim 5, wherein $$Wb1 \neq Wa1.$$

7. The display panel according to claim 6, wherein $$Wb1 < Wa1.$$

8. The display panel according to claim 2, wherein the bias adjustment stage is located after the data write stage; and a time length of a time period between turning-on of the compensation module and the start of the data write stage is Wb2, and a time length of a time period between the end of the bias adjustment stage and turning-off of the compensation module is Wa2;

wherein Wb2≥0, and/or Wa2≥0.

9. The display panel according to claim 8, wherein $$Wb2 \neq Wa2.$$

10. The display panel according to claim 9, wherein $$Wb2 > Wa2.$$

11. The display panel according to claim 1, wherein the reset module is on in the bias adjustment stage and the reset stage and is turned off at least after the compensation module is turned on; and a time length of the bias adjustment stage is Ws, a time length of a time period between an end of the bias adjustment stage and turning-on of the compensation module is Wt3, and a time length of the reset stage is Wr;

wherein Wr≥(Ws+Wt3).

12. The display panel according to claim 11, wherein a time length of a time period when the reset stage overlaps the time period when the compensation module is turned on is Wt4; wherein Wr≥(Ws+Wt3+Wt4).

13. The display panel according to claim 12, wherein a time length of a time period between a start of the reset stage and a start of the bias adjustment stage is Wb3; wherein Wb3≥0.

14. The display panel according to claim 13, wherein $$Wb3 \neq Wt4.$$

15. The display panel according to claim 13, wherein $$Wb3 \leq Wt4.$$

16. The display panel according to claim 1, wherein the reset module is connected to the gate of the drive transistor; the data write module is connected to the first electrode of the drive transistor; and the bias adjustment module is connected to the first electrode of the drive transistor or the second electrode of the drive transistor.

17. The display panel according to claim 1, wherein when the compensation module is turned on, the bias adjustment module transmits the bias adjustment signal to the gate of the drive transistor in the bias adjustment stage; and when the compensation module is turned off, the bias adjustment module transmits the bias adjustment signal to the first electrode of the drive transistor and/or the second electrode of the drive transistor in the bias adjustment stage.

18. The display panel according to claim 1, wherein the bias adjustment stage comprises a first bias adjustment stage and a second bias adjustment stage, the first bias adjustment stage is located before the data write stage, and the second bias adjustment stage is located after the data write stage, wherein the compensation module is on in the first bias adjustment stage, the data write stage, and a time period between the first bias adjustment stage and the data write stage.

19. The display panel according to claim 1, wherein the bias adjustment stage comprises a first bias adjustment stage and a second bias adjustment stage, the first bias adjustment stage is located before the data write stage, and the second bias adjustment stage is located after the data write stage, wherein the reset module is on in the first bias adjustment stage and the reset stage and is turned off at least after the compensation module is turned on.

20. A display device, comprising a display panel, wherein the display panel comprising: a pixel circuit and a light-emitting element;

wherein the pixel circuit comprises a drive module, a compensation module, a reset module, a data write module, and a bias adjustment module;

the drive module comprises a drive transistor; the drive transistor comprises a gate, a first electrode, and a second electrode; and the compensation module is connected between the gate of the drive transistor and the second electrode of the drive transistor;

a working process of the display panel comprises a reset stage, a data write stage, and a bias adjustment stage;

the reset module is configured to supply a reset signal to the drive transistor in the reset stage;

the data write module is configured to supply a data signal to the drive transistor in the data write stage; and in the bias adjustment stage, the bias adjustment module is turned on and is configured to supply a bias adjustment signal to the drive transistor;

wherein the display panel satisfies at least one of the following:

the compensation module is on in the bias adjustment stage, the data write stage, and a time period between the bias adjustment stage and the data write stage; or the reset module is on in the bias adjustment stage and the reset stage and is turned off at least after the compensation module is turned on, and a time period in which the reset module is turned on overlaps a time period in which the compensation module is turned on.

* * * * *